United States Patent
Hamachi et al.

(10) Patent No.: US 6,891,795 B1
(45) Date of Patent: May 10, 2005

(54) NODE DEVICE

(75) Inventors: Hiroki Hamachi, Fukuoka (JP);
Fumiharu Etoh, Fukuoka (JP);
Tomoyuki Furutono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 875 days.

(21) Appl. No.: 09/689,316

(22) Filed: Oct. 12, 2000

(30) Foreign Application Priority Data

Jan. 31, 2000 (JP) ........................................ 2000-022496

(51) Int. Cl.⁷ ............................ H04L 12/26; H04J 3/14; G06F 11/00; G08C 15/00
(52) U.S. Cl. ...................... 370/227; 370/238; 370/252; 370/409; 709/220; 709/223
(58) Field of Search ................................ 370/218, 227, 370/238, 230, 252, 351, 395, 409, 401, 468, 254, 392, 389; 709/238, 239, 241, 244, 220, 223

(56) References Cited

U.S. PATENT DOCUMENTS

| | | | | |
|---|---|---|---|---|
| 4,875,208 A | * | 10/1989 | Furuhashi et al. | 370/400 |
| 5,233,604 A | * | 8/1993 | Ahmadi et al. | 370/238 |
| 5,491,690 A | * | 2/1996 | Alfonsi et al. | 370/404 |
| 5,930,259 A | * | 7/1999 | Katsube et al. | 370/409 |
| 5,933,425 A | * | 8/1999 | Iwata | 370/351 |
| 6,034,961 A | * | 3/2000 | Masuo et al. | 370/395 |
| 6,201,810 B1 | * | 3/2001 | Masuda et al. | 370/395 |
| 6,272,111 B1 | * | 8/2001 | Murase | 370/237 |
| 6,341,127 B1 | * | 1/2002 | Katsube et al. | 370/352 |
| 6,366,559 B1 | * | 4/2002 | Krishnan et al. | 370/230 |
| 6,584,110 B1 | * | 6/2003 | Mizuta et al. | 370/401 |
| 6,687,230 B1 | * | 2/2004 | Furutono et al. | 370/238 |

FOREIGN PATENT DOCUMENTS

JP          05006446          1/1993

* cited by examiner

*Primary Examiner*—Man Phan
(74) *Attorney, Agent, or Firm*—Katten Muchin Zavis Rosenman

(57) ABSTRACT

In a node device having a function of recognizing route information of a network, a route selector selects a connection setting route based on the dynamic route information of the network, and generates a reservation request of a predetermined optimum route unless the connection setting route is the predetermined optimum route, a route switchover reservation portion monitors whether or not the predetermined optimum route becomes available based on the route information during the communication, and makes switchover instructions toward the predetermined optimum route to a call processor. The call processor sets a connection in a selected connection setting route, and sets another connection in the predetermined optimum route by the switchover instructions.

5 Claims, 18 Drawing Sheets

FIG.3A   INITIAL STATUS
| ROUTE | ROUTE LIST | PASSING NODE DEVICE NUMBER | ACR (CELL RATE) |
|---|---|---|---|
| 51 | 11→12→13 | 1 | 5,000cps |
| 52 | 11→14→15→13 | 2 | 15,000cps |
FIG.3B   AFTER TOPOLOGY CHANGE
| ROUTE | ROUTE LIST | PASSING NODE DEVICE NUMBER | ACR (CELL RATE) |
|---|---|---|---|
| 51 | 11→12→13 | 1 | 20,000cps |
| 52 | 11→14→15→13 | 2 | 15,000cps |
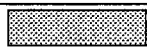 : CHANGED PORTION FIG.4A ROUTE SWITCHOVER RESERVATION SEQUENCE
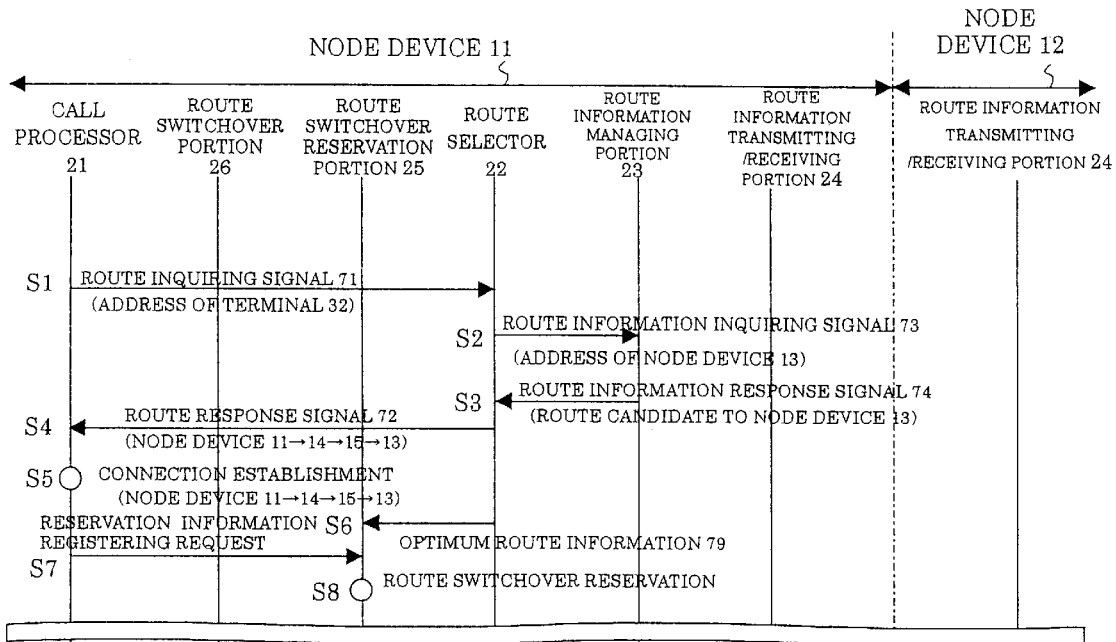
FIG.4B OPTIMUM ROUTE SWITCHOVER SEQUENCE
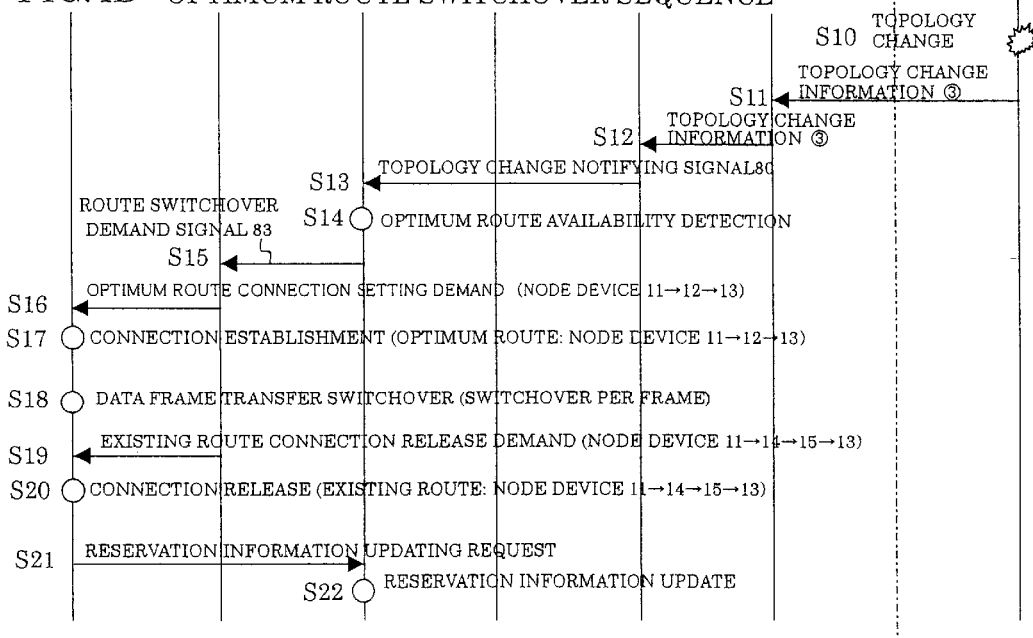

FIG.5A  INITIAL STATUS

| CONNECTION INFORMATION | | SET CONNECTION ROUTE INFORMATION | | | OPTIMUM ROUTE RESERVATION INFORMATION | | |
|---|---|---|---|---|---|---|---|
| CALL IDENTI-FIER | DEMAND CELL RATE (cps) | ROUTE | PASSING NODE DEVICE NUMBER | AVAILABLE CELL RATE (cps) | ROUTE | PASSING NODE DEVICE NUMBER | RESER-VATION CELL RATE (cps) |
| 0001 | 10,000 | 52 (11→14→15→13) | 2 | 10,000 | 51 (11→12→13) | 1 | 10,000 |

FIG.5B  UPDATED STATUS

| CONNECTION INFORMATION | | SET CONNECTION ROUTE INFORMATION | | | OPTIMUM ROUTE RESERVATION INFORMATION | | |
|---|---|---|---|---|---|---|---|
| CALL IDENTI-FIER | DEMAND CELL RATE (cps) | ROUTE | PASSING NODE DEVICE NUMBER | AVAILABLE CELL RATE (cps) | ROUTE | PASSING NODE DEVICE NUMBER | RESER-VATION CELL RATE (cps) |
| 0002 | 10,000 | 52 (11→12→13) | 1 | 10,000 | — | 1 | 10,000 |

▨ : CHANGED PORTION

FIG.6A  INITIAL STATUS
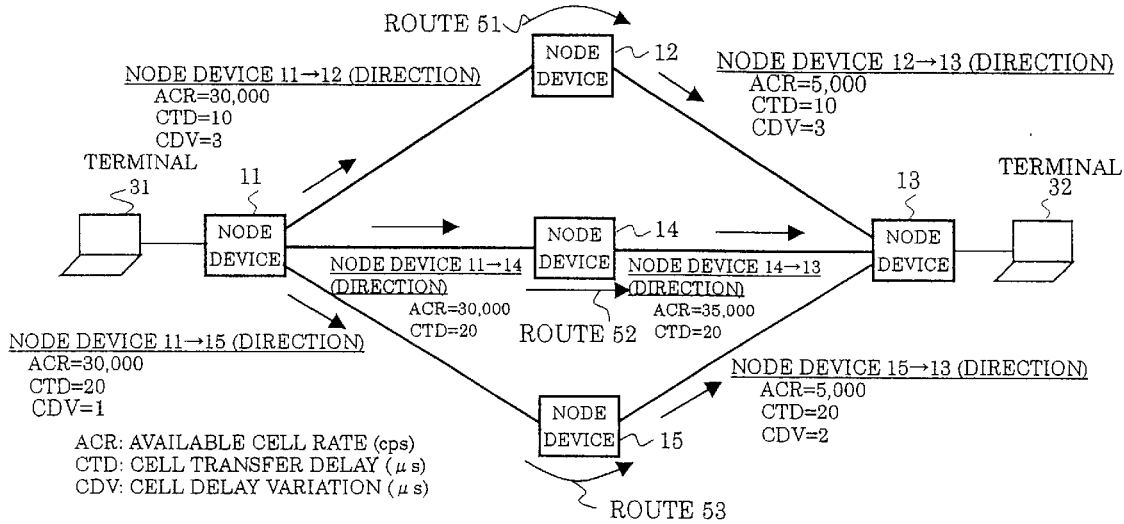
FIG.6B  FIRST CONNECTION SETTING
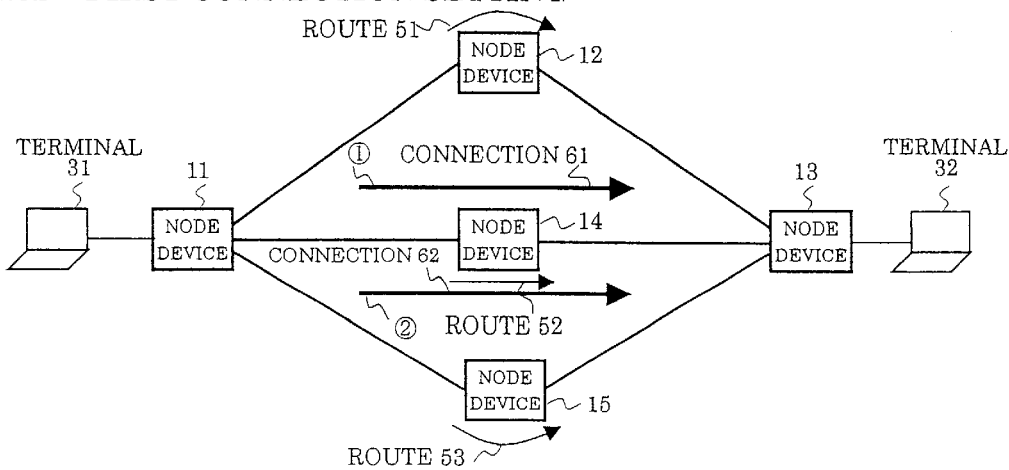
FIG.6C  ROUTE SWITCHOVER
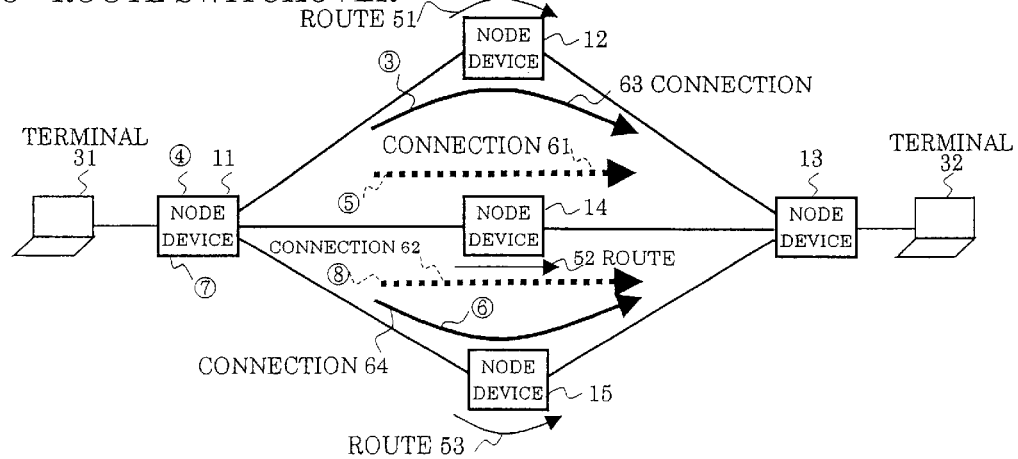

FIG.7A  INITIAL STATUS

| ROUTE | ROUTE LIST | ACR (CELL RATE) | CTD (DELAY) | CDV (VARIATION) |
|---|---|---|---|---|
| 51 | 11→12→13 | 5,000cps | 20μs | 6μs |
| 52 | 11→14→13 | 30,000cps | 40μs | 5μs |
| 53 | 11→15→13 | 5,000cps | 40μs | 3μs |

FIG.7B  AFTER SETTING OF CONNECTION 61

| ROUTE | ROUTE LIST | ACR (CELL RATE) | CTD (DELAY) | CDV (VARIATION) |
|---|---|---|---|---|
| 51 | 11→12→13 | 5,000cps | 20μs | 6μs |
| 52 | 11→14→13 | 20,000cps | 40μs | 5μs |
| 53 | 11→15→13 | 5,000cps | 40μs | 3μs |

▓ : CHANGED PORTION

FIG.8A  AFTER SETTING OF CONNECTION 61

| CALL IDENTIFIER | DEMANDED QoS INFORMATION ||| SET CONNECTION ROUTE INFORMATION |||| OPTIMUM ROUTE RESERVATION INFORMATION ||||
|---|---|---|---|---|---|---|---|---|---|---|
| | DEMAND CELL RATE (cps) | DEMAND DELAY (μs) | DEMAND VARIATION (μs) | ROUTE | AVAILA-BLE CELL RATE (cps) | DELAY (μs) | VARIATION (μs) | ROUTE | RESER-VATION CELL RATE (cps) | DELAY (μs) | VARIATION (μs) |
| 0001 | 10,000 | 30 | -- | 52→11→14→13 | 10,000 | 40 | 5 | 51→11→12→13 | 10,000 | 20 | 6 |

▨ : UNSATISFIED QoS

FIG.8B  AFTER SETTING OF CONNECTION 62

| CALL IDENTIFIER | DEMANDED QoS INFORMATION ||| SET CONNECTION ROUTE INFORMATION |||| OPTIMUM ROUTE RESERVATION INFORMATION ||||
|---|---|---|---|---|---|---|---|---|---|---|
| | DEMAND CELL RATE (cps) | DEMAND DELAY (μs) | DEMAND VARIATION (μs) | ROUTE | AVAILA-BLE CELL RATE (cps) | DELAY (μs) | VARIATION (μs) | ROUTE | RESER-VATION CELL RATE (cps) | DELAY (μs) | VARIATION (μs) |
| 0001 | 10,000 | 30 | -- | 52→11→14→13 | 10,000 | 40 | 5 | 51→11→12→13 | 10,000 | 20 | 6 |
| 0002 | 10,000 | -- | 4 | 52→11→14→13 | 10,000 | 40 | 6 | 53→11→15→13 | 10,000 | 40 | 3 |

▨ : UNSATISFIED QoS

FIG.9A  FIRST CONNECTION SETTING
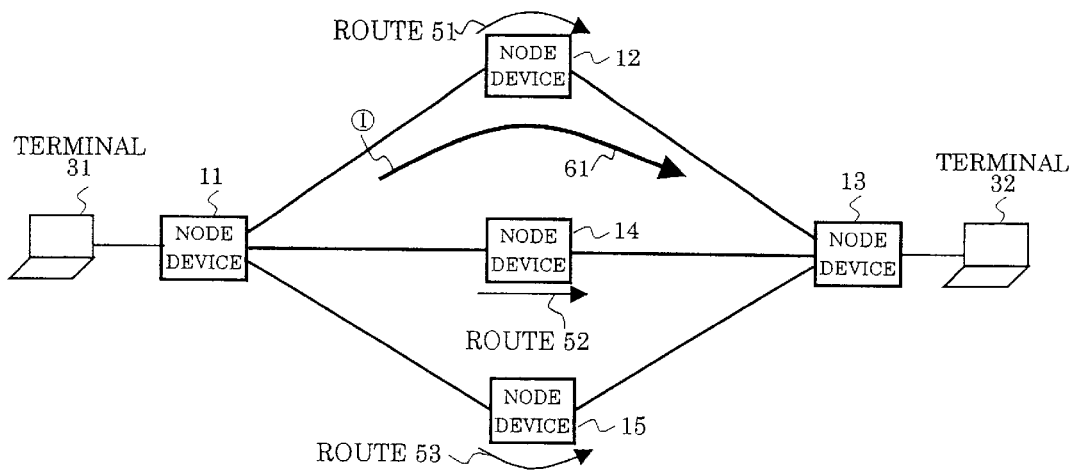
FIG.9B  TOPOLOGY CHANGE (1)
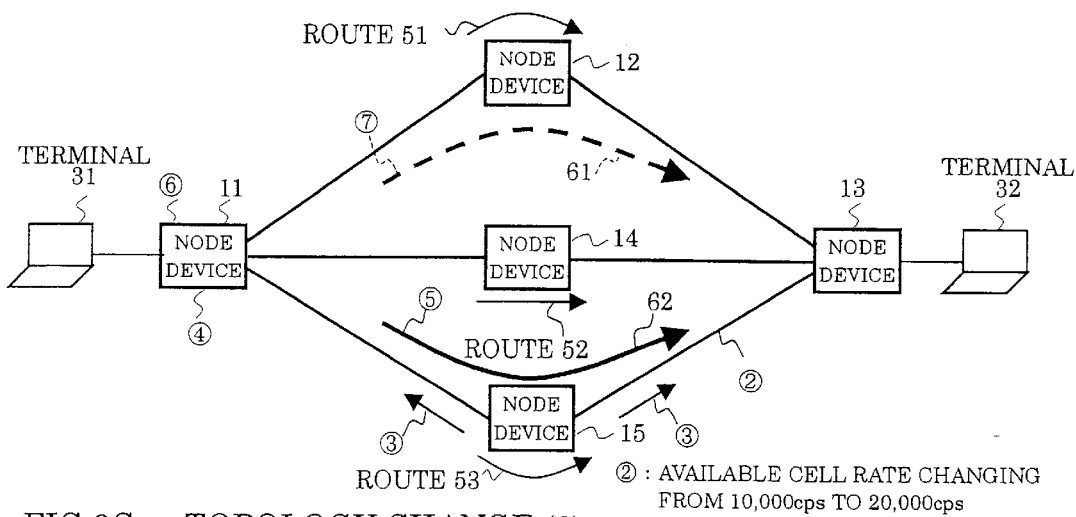
FIG.9C  TOPOLOGY CHANGE (2)
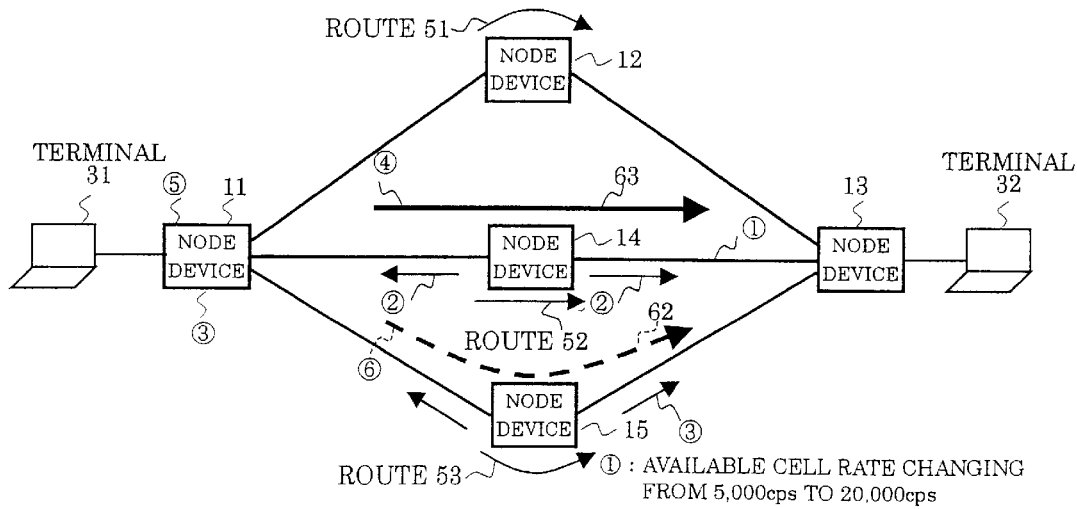

FIG.10
| ROUTE | ROUTE LIST | ACR (CELL RATE) | CTD (DELAY) | CDV (VARIATION) |
|---|---|---|---|---|
| 51 | 11→12→13 | 20,000cps | 50 μs | 6 μs |
| 52 | 11→14→13 | 5,000cps | 20 μs | 5 μs |
| 53 | 11→15→13 | 10,000cps | 40 μs | 3 μs |
FIG.12A  SETTING OF CONNECTION 61
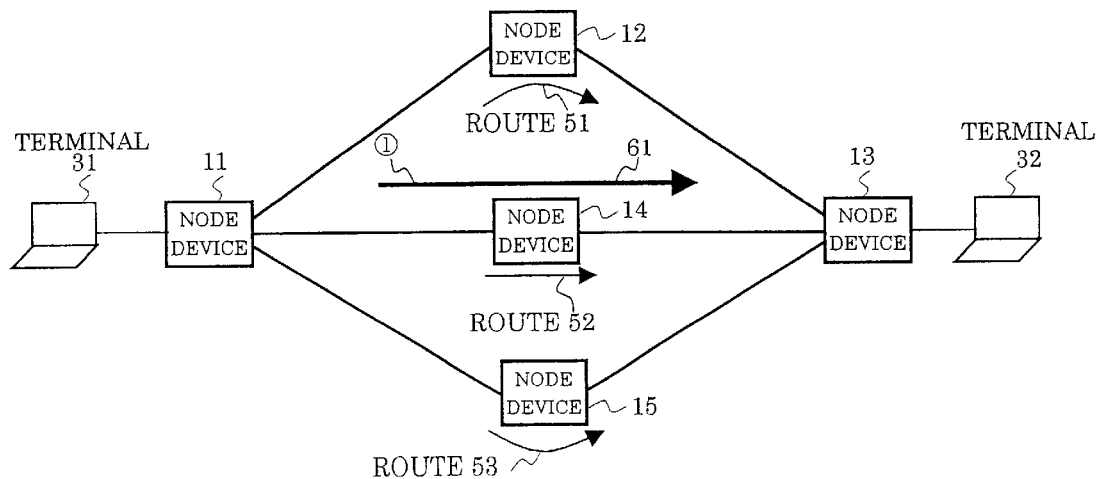
FIG.12B  SETTING OF CONNECTION 62
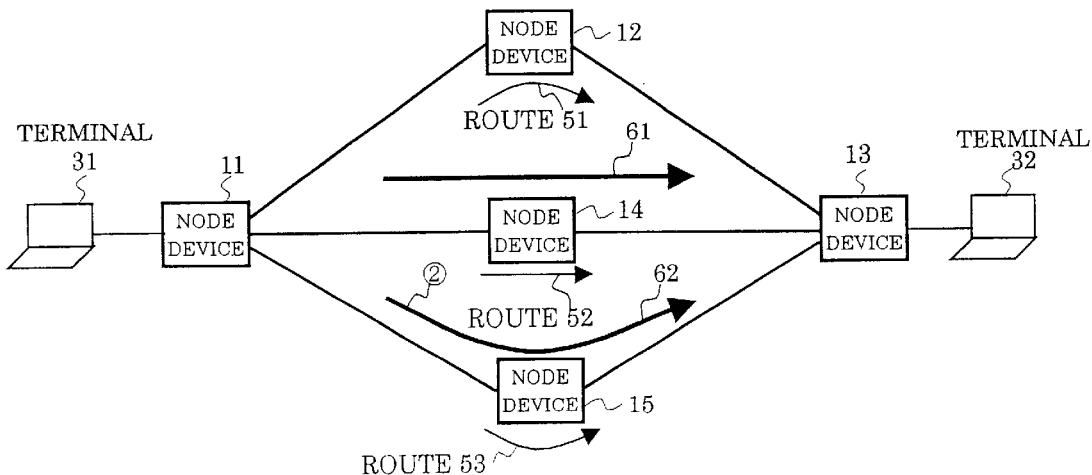

FIG.11A

| CALL IDENTIFIER | DEMANDED QoS INFORMATION ||| SET CONNECTION ROUTE INFORMATION |||| OPTIMUM ROUTE RESERVATION INFORMATION ||||
|---|---|---|---|---|---|---|---|---|---|---|
| | DEMAND CELL RATE (cps) | DEMAND DELAY (μs) | DEMAND VARIATION (μs) | ROUTE | AVAILABLE CELL RATE (cps) | DELAY (μs) | VARIATION (μs) | ROUTE | RESERVATION CELL RATE (cps) | DELAY (μs) | VARIATION (μs) |
| 0001 | 10,000 | 30 | — | 51 11→12→13 | 10,000 | 50 | 6 | 52 11→14→13 | 10,000 | 20 | 3 |
| | | | | | | | | 53 11→15→13 | 10,000 | 40 | 5 |

FIG.11B

| CALL IDENTIFIER | DEMANDED QoS INFORMATION ||| SET CONNECTION ROUTE INFORMATION |||| OPTIMUM ROUTE RESERVATION INFORMATION ||||
|---|---|---|---|---|---|---|---|---|---|---|
| | DEMAND CELL RATE (cps) | DEMAND DELAY (μs) | DEMAND VARIATION (μs) | ROUTE | AVAILABLE CELL RATE (cps) | DELAY (μs) | VARIATION (μs) | ROUTE | RESERVATION CELL RATE (cps) | DELAY (μs) | VARIATION (μs) |
| 0002 | 10,000 | 30 | — | 53 11→15→13 | 10,000 | 40 | 5 | 52 11→14→13 | 10,000 | 20 | 3 |

FIG13A  INITIAL STATUS

| ROUTE | ROUTE LIST | ACR (CELL RATE) | CTD (DELAY) | CDV (VARIATION) |
|---|---|---|---|---|
| 51 | 11→12→13 | 5,000cps | 20 μs | 6 μs |
| 52 | 11→14→13 | 15,000cps | 40 μs | 3 μs |
| 53 | 11→15→13 | 30,000cps | 40 μs | 5 μs |

FIG13B  AFTER SETTING OF CONNECTION 61

| ROUTE | ROUTE LIST | ACR (CELL RATE) | CTD (DELAY) | CDV (VARIATION) |
|---|---|---|---|---|
| 51 | 11→12→13 | 5,000cps | 20 μs | 6 μs |
| 52 | 11→14→13 | 5,000cps | 40 μs | 3 μs |
| 53 | 11→15→13 | 30,000cps | 40 μs | 5 μs |

▒ : CHANGED PORTION

FIG13C  AFTER SETTING OF CONNECTION 62

| ROUTE | ROUTE LIST | ACR (CELL RATE) | CTD (DELAY) | CDV (VARIATION) |
|---|---|---|---|---|
| 51 | 11→12→13 | 5,000cps | 20 μs | 6 μs |
| 52 | 11→14→13 | 5,000cps | 40 μs | 3 μs |
| 53 | 11→15→13 | 20,000cps | 40 μs | 5 μs |

▒ : CHANGED PORTION

FIG13D  AFTER ROUTE SWITCHOVER OF CONNECTION 62

| ROUTE | ROUTE LIST | ACR (CELL RATE) | CTD (DELAY) | CDV (VARIATION) |
|---|---|---|---|---|
| 51 | 11→12→13 | 5,000cps | 20 μs | 6 μs |
| 52 | 11→14→13 | 15,000cps | 40 μs | 3 μs |
| 53 | 11→15→13 | 10,000cps | 40 μs | 5 μs |

▒ : CHANGED PORTION

FIG.14A  AFTER SETTING OF CONNECTION 61

| DEMANDED QoS INFORMATION | | | | SET CONNECTION ROUTE INFORMATION | | | | OPTIMUM ROUTE RESERVATION INFORMATION | | | |
|---|---|---|---|---|---|---|---|---|---|---|---|
| CALL IDENTI-FIER | DE-MAND CELL RATE (cps) | DE-MAND DELAY (μs) | DE-MAND VARI-ATION (μs) | ROUTE | AVAILA-BLE CEL RATE (cps) | DE-LAY (μs) | VARI-ATION (μs) | ROUTE | RESER-VATION CELL RATE (cps) | DE-LAY (μs) | VARI-ATION (μs) |
| 0001 | 10,000 | 30 | -- | 52 11→14→13 | 10,000 | 40 | 3 | 51 11→12→13 | 10,000 | 20 | 6 |

: UNSATISFIED QoS

FIG.14B  AFTER SETTING OF CONNECTION 62

| DEMANDED QoS INFORMATION | | | | SET CONNECTION ROUTE INFORMATION | | | | OPTIMUM ROUTE RESERVATION INFORMATION | | | |
|---|---|---|---|---|---|---|---|---|---|---|---|
| CALL IDENTI-FIER | DE-MAND CELL RATE (cps) | DE-MAND DELAY (μs) | DE-MAND VARI-ATION (μs) | ROUTE | AVAILA-BLE CELL RATE (cps) | DE-LAY (μs) | VARI-ATION (μs) | ROUTE | RESER-VATION CELL RATE (cps) | DE-LAY (μs) | VARI-ATION (μs) |
| 0001 | 10,000 | 30 | -- | 52 11→14→13 | 10,000 | 40 | 3 | 51 11→12→13 | 10,000 | 20 | 6 |
| 0002 | 10,000 | -- | 4 | 53 11→15→13 | 10,000 | 40 | 5 | 52 11→14→13 | 10,000 | 40 | 3 |

: UNSATISFIED QoS

FIG.14C  AFTER ROUTE SWITCHOVER OF CONNECTION 61

| DEMANDED QoS INFORMATION | | | | SET CONNECTION ROUTE INFORMATION | | | | OPTIMUM ROUTE RESERVATION INFORMATION | | | |
|---|---|---|---|---|---|---|---|---|---|---|---|
| CALL IDENTI-FIER | DE-MAND CELL RATE (cps) | DE-MAND DELAY (μs) | DE-MAND VARI-ATION (μs) | ROUTE | AVAILA-BLE CELL RATE (cps) | DE-LAY (μs) | VARI-ATION (μs) | ROUTE | RESER-VATION CELL RATE (cps) | DE-LAY (μs) | VARI-ATION (μs) |
| 0003 | 10,000 | 30 | -- | 52 11→15→13 | 10,000 | 40 | 5 | 51 11→12→13 | 10,000 | 20 | 6 |
| 0002 | 10,000 | -- | 4 | 53 11→15→13 | 10,000 | 40 | 5 | 52 11→14→13 | 10,000 | 40 | 3 |

: UNSATISFIED QoS

FIG.14D  AFTER ROUTE SWITCHOVER OF CONNECTION 62

| DEMANDED QoS INFORMATION | | | | SET CONNECTION ROUTE INFORMATION | | | | OPTIMUM ROUTE RESERVATION INFORMATION | | | |
|---|---|---|---|---|---|---|---|---|---|---|---|
| CALL IDENTI-FIER | DE-MAND CELL RATE (cps) | DE-MAND DELAY (μs) | DE-MAND VARI-ATION (μs) | ROUTE | AVAILA-BLE CELL RATE (cps) | DE-LAY (μs) | VARI-ATION (μs) | ROUTE | RESER-VATION CELL RATE (cps) | DE-LAY (μs) | VARI-ATION (μs) |
| 0003 | 10,000 | 30 | -- | 52 11→15→13 | 10,000 | 40 | 5 | 51 11→12→13 | 10,000 | 20 | 6 |

: UNSATISFIED QoS

FIG.15A   MANUAL SWITCHOVER OF CONNECTION 63
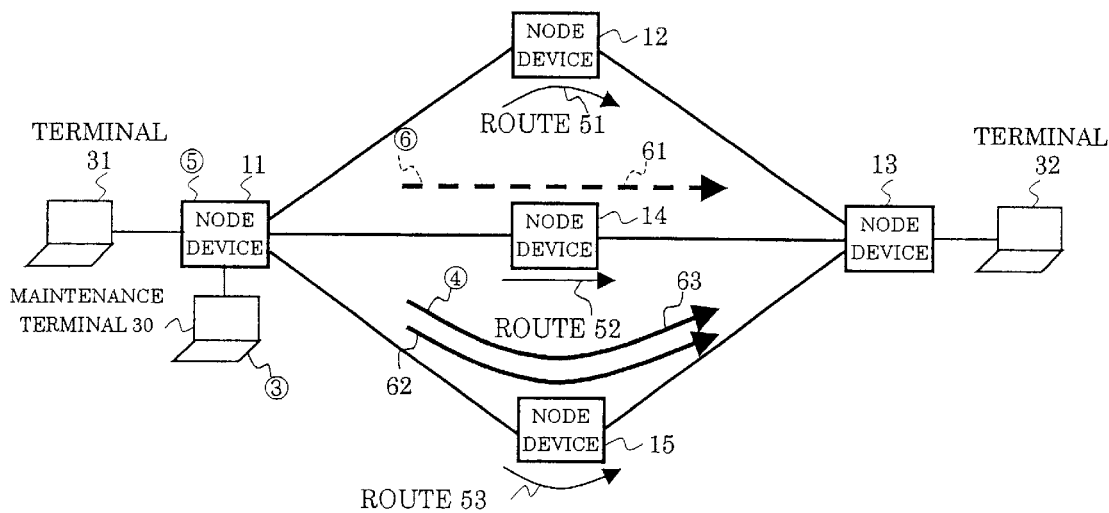
FIG.15B   MANUAL SWITCHOVER OF CONNECTION 62
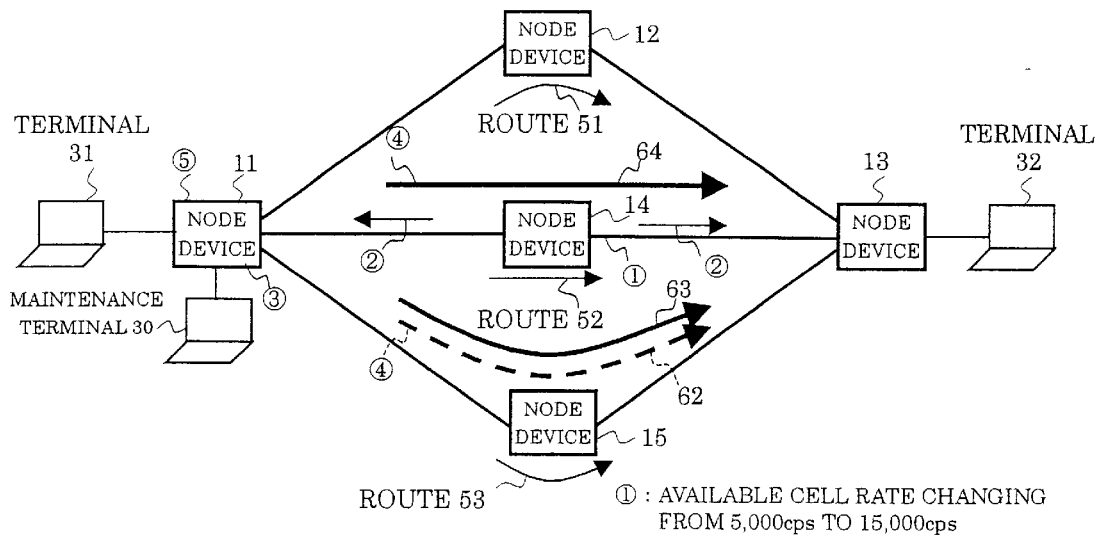

FIG.17A

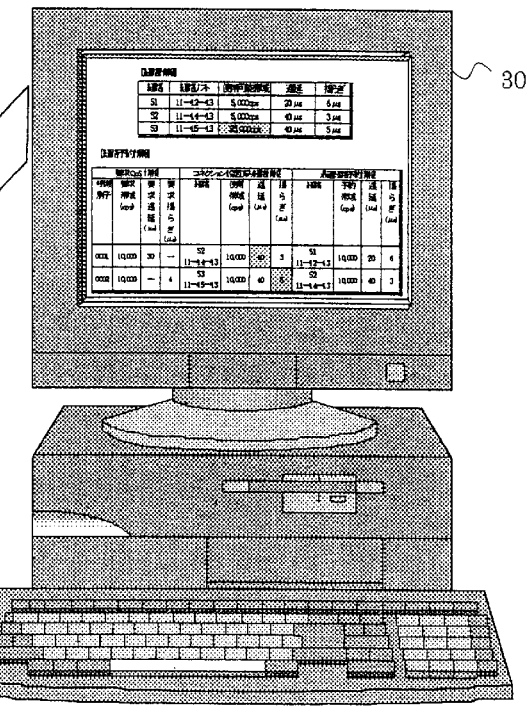

FIG.17B

[ROUTE INFORMATION] 77

| ROUTE | ROUTE LIST | AVAILABLE CELL RATE | DELAY | VARI-ATION |
|---|---|---|---|---|
| 51 | 11→12→13 | 5,000cps | 20 μs | 6 μs |
| 52 | 11→14→13 | 5,000cps | 40 μs | 3 μs |
| 53 | 11→15→13 | 20,000cps | 40 μs | 5 μs |

[ROUTE RESERVATION INFORMATION] 78

| DEMANDED QoS INFORMATION | | | | SET CONNECTION ROUTE INFORMATION | | | | OPTIMUM ROUTE RESERVATION INFORMATION | | | |
|---|---|---|---|---|---|---|---|---|---|---|---|
| CALL IDEN-TIFIER | DE-MAND CELL RATE (cps) | DE-MAND DE-LAY (μs) | DE-MAND VARI-ATION (μs) | ROUTE | AVAI-LABLE CELL RATE (cps) | DE-LAY (μs) | VARI-ATION (μs) | ROUTE | RESER-VATION CELL RATE (cps) | DE-LAY (μs) | VARI-ATION (μs) |
| 0001 | 10,000 | 30 | -- | 52 11→14→13 | 10,000 | 40 | 3 | 51 11→12→13 | 10,000 | 20 | 6 |
| 0002 | 10,000 | -- | 4 | 53 11→15→13 | 10,000 | 40 | 5 | 52 11→14→13 | 10,000 | 40 | 3 |

ACR: AVAILABLE CELL RATE (cps)
CTD: CELL TRANSFER DELAY (μs)

| ROUTE | ROUTE LIST | ACR (CELL RATE) | CTD (DELAY) |
|-------|------------|-----------------|-------------|
| 51    | 11→12→13   | 5,000cps        | 10 μs       |
| 52    | 11→14→15→13| 15,000cps       | 20 μs       | ously abbreviated as CTD) between
NODE DEVICE

BACKGROUND OF THE INVENTION

1. Field of the Invention

The present invention relates to a node device, and in particular to a node device which has a function of recognizing network route (path) information.

In recent years, a network which has a traffic processing function and a network routing function and which can support a multiplexed connection has been realized with an advance of a communication technique.

For example, a node device in which a PNNI (Private Network to Network Interface) specified by the ATM Forum is installed can grasp a network status such as a resource or a topology, and select the optimum route or path upon setting a connection by periodically or non-periodically transmitting/receiving network route information within the own node device to/from the adjoining node device.

In such a network, it is required to set the connection of the optimum route based on a selection reference corresponding to a user's demand such as Quality of Service (hereinafter, occasionally abbreviated as QoS).

2. Description of the Related Art

FIG. 18 shows an arrangement of a prior art node device. This node device 11 is composed of a route information transmitting/receiving portion 24 which transmits/receives route information 77 to/from a node device 12 through a communication line 40, a route information managing portion 23 which transmits/receives the route information 77 with a transmitting signal 75 and a receiving signal 76 through the transmitting/receiving portion 24 to be stored and managed as route information 70, a route selector 22 which selects a route based on the route information 70 (hereinafter, occasionally referred to as resource information) obtained by exchanging a route information inquiring signal 73 and a response signal 74 with the managing portion 23, and a call processor (processing portion) 21 which sets and releases a connection passing a route obtained by exchanging a route inquiring signal 71 and a response signal 72 with the selector 22.

This arrangement is similarly applied to ATM node devices in which the resource information of the own node device is exchanged with the other by the PNNI protocol.

FIG. 19A shows a network example composed of ATM node devices 11–15. The node devices 11 and 13 are connected with a route 51 passing the node device 12 and a route 52 passing the node devices 14 and 15. The node devices 11 and 13 respectively accommodate terminals 31 and 32.

The route information managing portion 23 of each node device periodically advertises the holding resource information (available cell rate, delay, and the like) of the trunk circuit of the own node device to the adjoining node devices through the route information transmitting/receiving portion 24 by the PNNI protocol, and receives the resource information transmitted from the other node devices through the route information transmitting/receiving portion 24 to hold the same in the route information 70 as database information.

Also, the route information managing portion 23 of each node device further advertises the resource information received from the other node devices to the adjoining node devices. Thus, each of the node devices can hold the resource information of all the node devices within the PNNI network.

Furthermore, when the network formation is changed by the PNNI protocol, the route information managing portion 23 can detect the fact for the notification between the node devices that the information within the network has been changed. Accordingly, the present network formation can be grasped as the route information.

FIG. 19A shows an "available cell rate" (unit: cps (cell per second)) (hereinafter, occasionally abbreviated as ACR) between the node devices, and a "cell transfer delay" (unit: µs) (hereinafter, occasionally abbreviated as CTD) between the node devices included in the route information 70 which the route information managing portion 23 of each node device holds.

For example, the ACR in the direction of node device 11→node device 12 is 15000 cps, and the CTD is 5 µs. The ACR in the direction of node device 12→node device 11 is 12000 cps, and the CTD is 4 µs. These ACR's and CTD's change according to the resource status.

When the connection setting is demanded, the route selector 22 recognizes, based on the database prepared from the resource information, how many routes there are from the own node device to the destination node device at that time, and determines the most advantageous route in the routes based on e.g. a quality of service (delay, cell delay variation, and the like) preset.

The operation example of the route selection upon setting the connection between the node devices 11 and 13 will now be described.

The call processor 21 of the node device 11 inquires of the route selector 22 the connection setting route up to the node device 13 by the route inquiring signal 71. The route selector 22 inquires of the route information managing portion 23 the route information to the node device 13 by the route information inquiring signal 73 to obtain topology information as the response signal 74.

Based on this topology information, the route selector 22 recognizes that there are two candidates of the route to the node device 13.

FIG. 19B shows the route candidates from the node device 11 to the node device 13. Namely, as the route from the node device 11 to the node device 13, there are two routes, i.e. the route 51 (node device 11→12→13) and the route 52 (node device 11→14→15→13). The ACR and CTD of the route 51 are respectively 5,000 cps and are 10 µs, and those of the route 52 are respectively 15,000 cps and 20 µs.

The ACR of each route indicates the minimum value of the available cell rates on the route, and the CTD indicates the total value of the CTD's on the route.

The route selector 22 of the node device 11 selects the route 51 with the smaller CTD between the two route candidates as the optimum route and responds to the call processor 21 by the response signal 72. The call processor 21 sets the connection passing the route 51 with respect to the node device 13.

It is general to realize the interworking between the current IP network and ATM network by the connection which does not consider the QoS, i.e. which uses UBR (Unspecified Bit Rate) for a service category (LANE 1.0, MPOA 1.0, and the like prescribed by the ATM Forum).

However, with the future extension of the IP network application, some QoS guarantee in the IP network becomes an important issue. Accordingly, the demand for the interworking between the IP network and the ATM network will extend, so that the cooperation of the ATM network relating to the QoS guarantee becomes important (in MPOA 1.0, QoS is supported by the negotiation function of non-realtime VBR (Variable Bit Rate)).

Protocols such as Diffserve (differentiated services) and RSVP (resource ReSerVation Protocol) relating to the QoS guarantee have been proposed in the IP network whereas in view of the installation thereof, its scale becomes large and so unrealistic.

As a proposal for a simple achievement of the installation, an ATM network where the ATM is made a backbone to guarantee the QoS can be mentioned.

However, by a route selection method in the ATM network, upon setting the connection between the node devices, the optimum route for satisfying conditions such as QoS is selected from the available routes to set the connection. Therefore, even when the network topology changes after setting the connection and more optimum route becomes available, a disadvantageous route set upon setting the first connection should be kept being used. Alternatively, the connection setting can not be made because the QoS can not be satisfied from the beginning.

Moreover, as for the IP data it is often thought from its character that the connection should be set by using a temporarily available route even if it does not completely satisfy the QoS, so that it is thought effective that a flexible route selection can be performed by switching the route over to another which satisfies the QoS when it becomes available.

Namely, by the above-mentioned reason, the prior art route selection processing has been limited only for the connection setting, so that there has been a problem that even when a more advantageous route becomes available the route selection can not be performed again.

As measures for solving this problem, in the Japanese patent publication laid-open No.10-93567, the node device which has detected the change of the route information notifies the terminal on the transmitting side that an optimum route becomes available, so that the terminal on the transmitting side performs the call setting again to try again the connection setting on the optimum route. Thus, the switchover to the optimum route corresponding to the change of the route information can be realized.

However, in order to notify the terminal on the transmitting side of the route information change and to try again the connection setting on the optimum route on the terminal side, the development of a new protocol and the installation of the concerned protocol in the terminal are required, which can not be regarded as realistic measures.

SUMMARY OF THE INVENTION

It is accordingly an object of the present invention to provide a node device which has a function of recognizing route information of a network and which particularly realizes a switchover a route during communication to a more optimum route without a new protocol corresponding to dynamic changes of resource and topology in the network.

In order to achieve the above-mentioned object, a node device of the present invention according to claim 1 comprises a route information managing portion for managing dynamic route information of a network, a route selector for selecting a connection setting route based on the route information upon starting a communication, and for generating a reservation request of a predetermined optimum route unless the connection setting route is the predetermined optimum route, a route switchover reservation portion for managing the predetermined optimum route as route reservation information in response to the reservation request, for monitoring whether or not the predetermined optimum route becomes available based on the route information during the communication, and for making switchover instructions toward the predetermined optimum route when the predetermined optimum route becomes available, and a call processor for setting a first connection in the selected connection setting route and for setting a second connection in the predetermined optimum route by the switchover instructions.

Namely, the route selector selects the connection setting route which enables the connection to be set based on the dynamic route information of the network managed by the route information managing portion upon starting the communication.

Unless the connection setting route is a predetermined optimum route, the route selector reserves the predetermined optimum route at the route switchover reservation portion and notifies the call processor of the connection setting route, so that the call processor sets the first connection passing the connection setting route.

When the predetermined optimum route is reserved, the route switchover reservation portion manages this route as route reservation information and monitors whether or not the predetermined optimum route becomes available based on the route information. When it becomes available, the route switchover reservation portion notifies the call processor of the fact.

The call processor sets the second connection passing the predetermined optimum route, and switches or changes over the first connection of the existing connection setting route to the second connection.

Thus, when the selected route selected upon starting the communication is not the optimum route and the optimum route becomes available with e.g. the change of the topology and the resource status during the communication, it becomes possible to dynamically switch over the connection to the optimum route.

Also, in the present invention of claim 2 according to the present invention of claim 1, the call processor may confirm that a data transmission/reception at the first connection has been completed to release the first connection after setting the second connection.

Namely, after setting the second connection of the optimum route, the call processor confirms that there is no transmission/reception of the data in the existing first connection to release the first connection.

Thus, it becomes possible to switch over the connection to the optimum route without losing the data.

Also, in the present invention of claim 3 according to the present invention of claim 1, the route selector may generate a reservation request of a plurality of optimum routes with priorities set, and the route switchover reservation portion may make the switchover instructions toward the predetermined optimum route based on the priorities.

Namely, the route selector selects a plurality of routes as the optimum route upon starting the communication, sets priorities in these routes, and generates the reservation request to the route switchover reservation portion.

The route switchover reservation portion provides the call processor with the instructions of the switchover to the optimum route with the highest priority in the optimum routes which have become available based on the route information.

Thus, it becomes possible to switch over the connection to the optimum route, which has become available and which is more advantageous than the present route, in a plurality of reserved optimum routes. Accordingly, if the communication is continued, the communication can be finally performed with the connection switched over to the one passing the optimum route with the highest priority.

Also, in the present invention of claim 4 according to the present invention of claim 1, the route selector may generate the reservation request of the predetermined optimum route based on a predetermined quality of service (QoS).

Namely, the optimum route is selected based on a predetermined QoS, designated by e.g. a user, that is e.g. at least one of the QoS's among the available cell rate, the cell transfer delay, and the cell delay variation.

Thus, it becomes possible to switch over the connection setting route in order to correspond to the QoS designated by the user.

Also, the route selector may generate the reservation request of the optimum route based on the passing number of node devices.

Also, the present invention according to the present invention of any one of claims 1 to 4 may further comprise a route information display for displaying at least one of the route information, the route reservation information, and available status information of the routes.

Thus, it becomes possible for e.g. a maintenance person (user) to grasp the present route information, the route reservation information, and the usage status of the routes.

Also, the present invention according to the present invention may further comprise a route switchover instructing portion for providing the call processor with instructions for switching over a predetermined connection to a predetermined route.

Thus, the maintenance person (user) can instruct to switch over the existing connection to the connection of the predetermined route based on e.g. the display information of the route information display, and can switch over the connection corresponding to the usage status. As a result, it becomes possible to more efficiently utilize the resource of the network.

BRIEF DESCRIPTION OF THE DRAWINGS

FIGS. 3A and 3B are diagrams showing route information examples in the operation embodiment (1) of a node device according to the present invention;

FIGS. 4A and 4B are sequence diagrams of the operation embodiment (1) of a node device according to the present invention;

FIGS. 5A and 5B are diagrams showing route reservation information examples in the operation embodiment (1) of a node device according to the present invention;

FIGS. 6A-6C are block diagrams showing an operation embodiment (2) of a node device according to the present invention;

FIGS. 7A and 7B are diagrams showing route information examples in the operation embodiment (2) of a node device according to the present invention;

FIGS. 8A and 8B are diagrams showing route reservation information examples in the operation embodiment (2) of a node device according to the present invention;

FIGS. 9A-9C are block diagrams showing an operation embodiment (3) of a node device according to the present invention;

FIG. 10 is a diagram showing a route information example in the operation embodiment (3) of a node device according to the present invention;

FIGS. 11A and 11B are diagrams showing route reservation information examples in the operation embodiment (3) of a node device according to the present invention;

FIGS. 12A and 12B are block diagrams (1) showing an operation embodiment (4) of a node device according to the present invention;

FIGS. 13A-13D are diagrams showing route information examples in the operation embodiment (4) of a node device according to the present invention;

FIGS. 14A-14D are diagrams showing route reservation information examples in the operation embodiment (4) of a node device according to the present invention;

FIGS. 15A and 15B are block diagrams (2) showing the operation embodiment (4) of a node device according to the present invention;

FIGS. 17A and 17B are diagrams showing route information display examples in the operation embodiment (4) of a node device according to the present invention;

Throughout the figures, like reference numerals indicate like or corresponding components.

DESCRIPTION OF THE EMBODIMENTS

Figure 1:
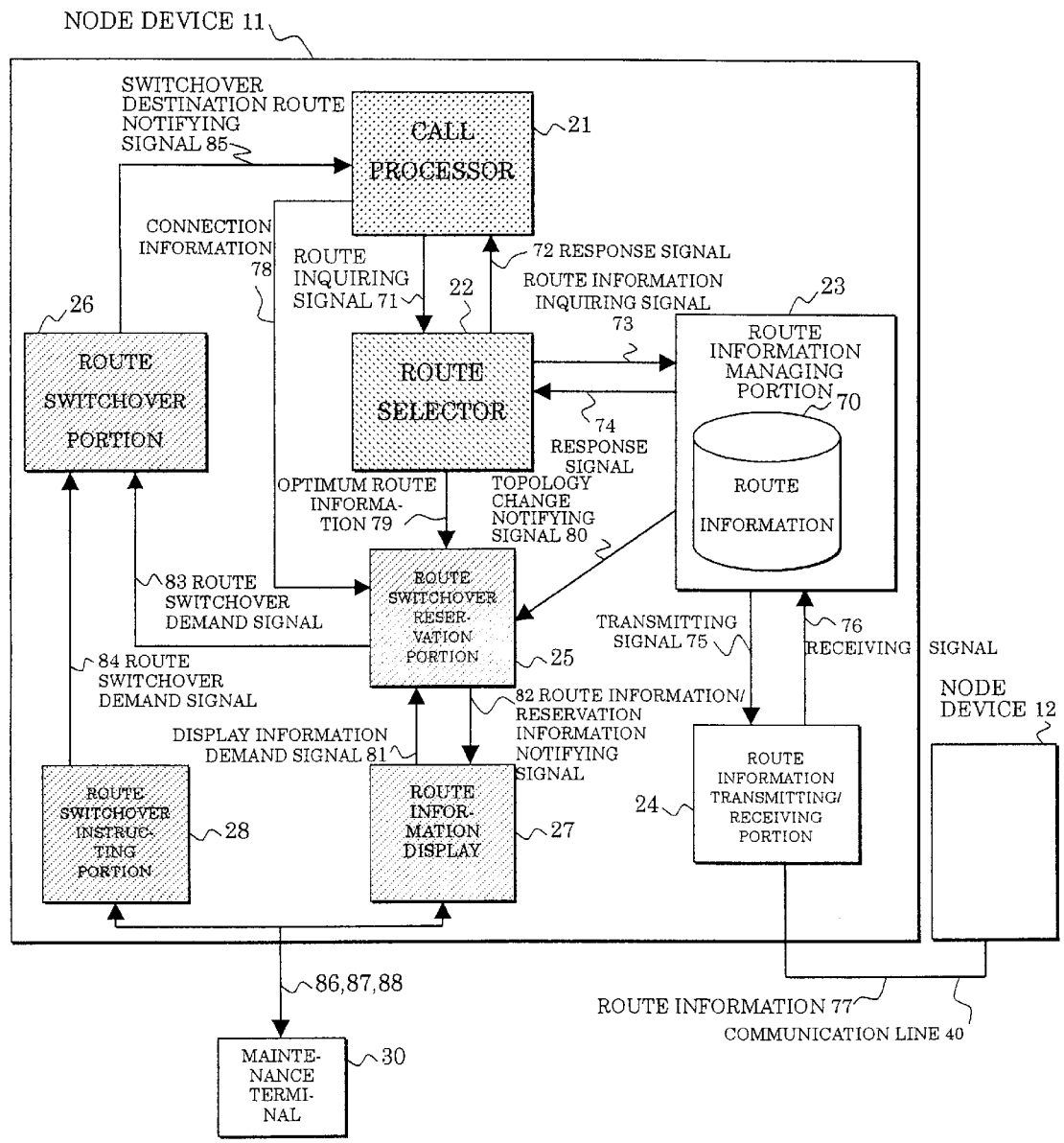
FIG. 1 is a block diagram showing a structural embodiment of a node device according to the present invention.
Figure 18:
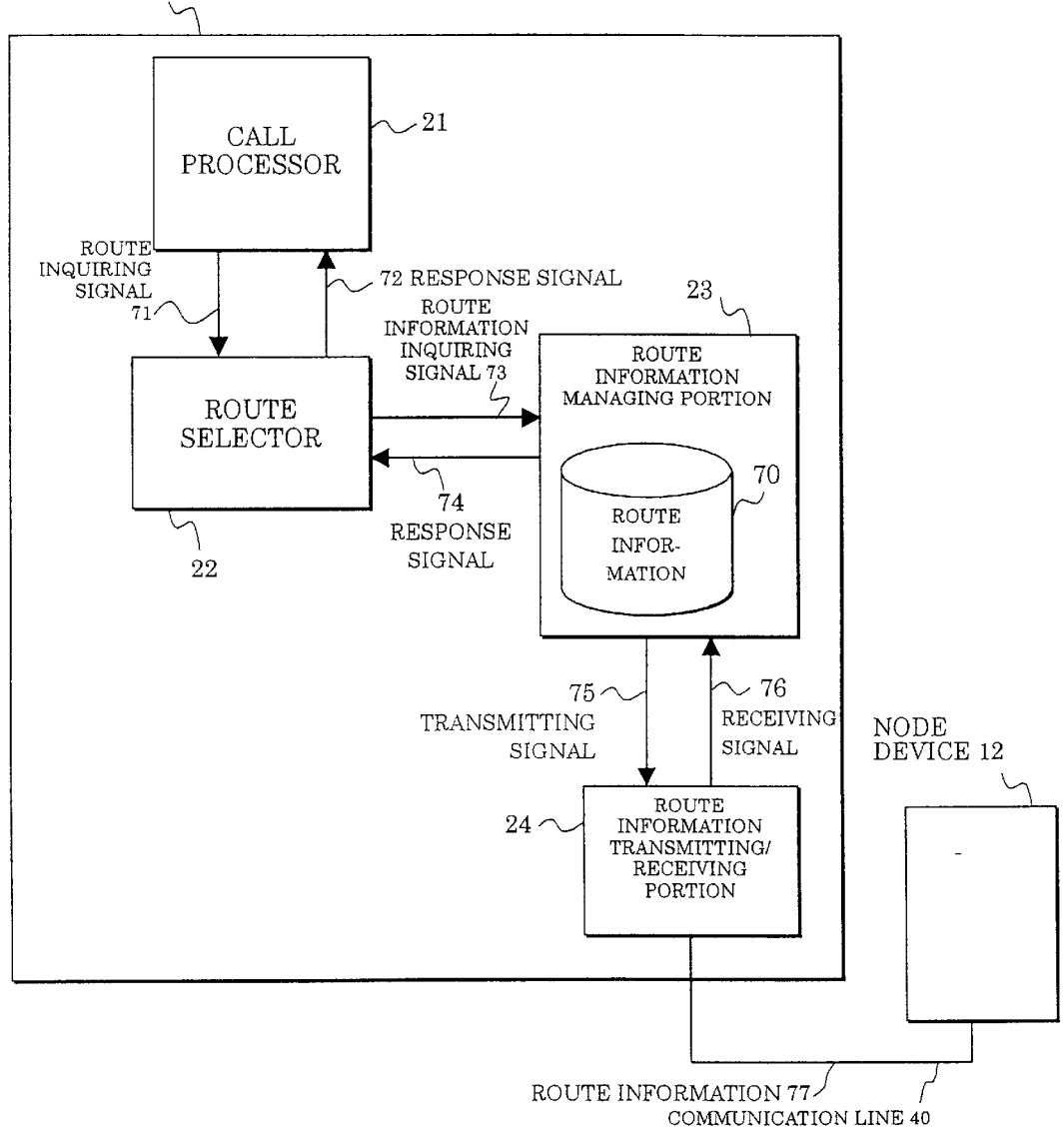
FIG. 18 is a block diagram showing an arrangement of a prior art node device.

FIG. 1 shows a structural embodiment of a node device 11 according to the present invention. This node device 11 is different from the prior art node device shown in FIG. 18 in that, as shown by the hatched portion, a route switchover reservation portion 25 which receives connection information 78, optimum route information 79, and a route information change notifying signal 80 respectively from a call processor 21, a route selector 22, and a route information managing portion 23, and a route switchover portion 26 which receives a route switchover demand signal 83 from the reservation portion 25 to provide the call processor 21 with a switchover destination route notifying signal 85 are included.

Furthermore, the node device 11 includes a route information display 27 for transmitting/receiving a display information demand signal 81 and a route information/reservation information notifying signal 82 to/from the reservation portion 25, and a route switchover instructing portion 28 for providing the route switchover portion 26 with a switchover demand signal 84. These display 27 and switchover instructing portion 28 are connected to a maintenance terminal 30.

It is to be noted that the route switchover portion 26 may be included in the call processor 21.

Embodiment (1)

Figure 2A:
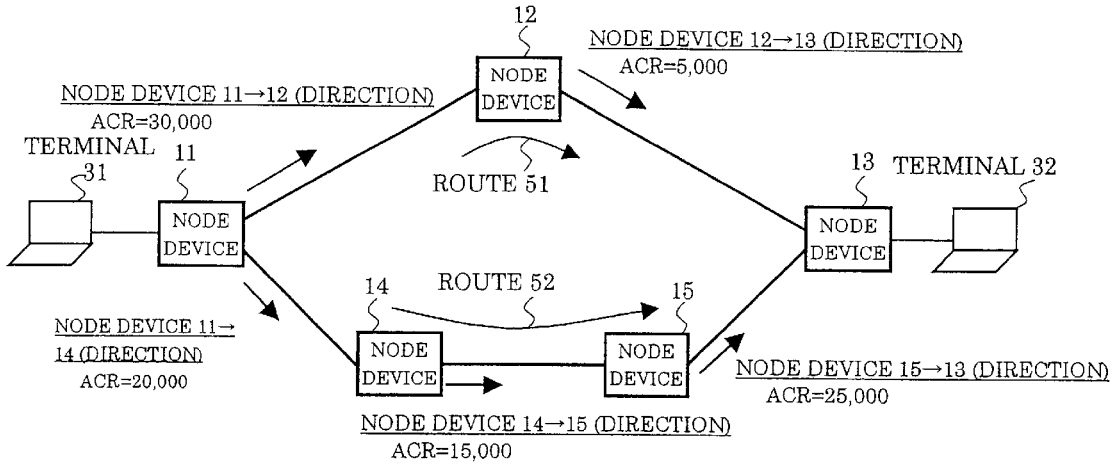
FIGS. 2A-2C are block diagrams showing an operation embodiment (1) of a node device according to the present invention.

FIG. 2A shows a network example composed of an ATM switch node device which forms a node device of the present invention. The arrangement of this network is the same as that shown in FIG. 19A including that the node devices 11 and 13 respectively accommodate terminals 31 and 32.

Figures 19A, 19B:
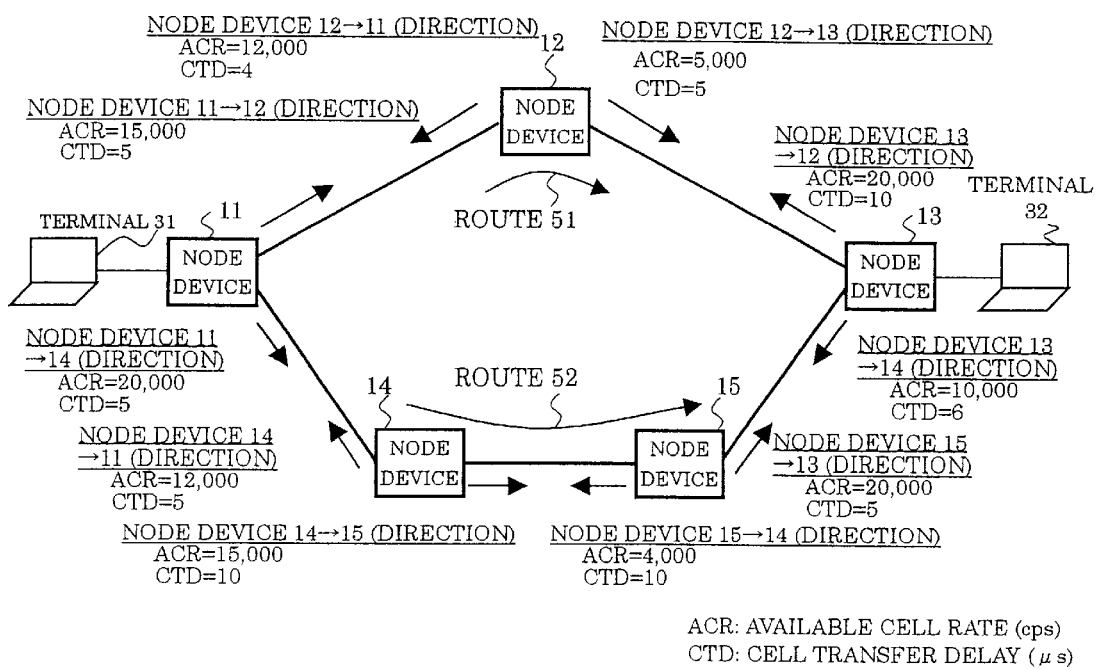
FIGS. 19A and 19B are diagrams showing route selection operation examples in a network arranged by the prior art node device.

In FIG. 2A, route information (topology information) is shown in the same way as FIG. 19A. However, only ACR's (available cell rate) relating to the routes 51 and 52 which extend to the node device 13 from the node device 11 are shown, and the other ACR's and CTD's are omitted.

Namely, the present route information is as follows;
ACR in the direction from node device 11 to node device 12=30,000 cps
ACR in the direction from node device 12 to node device 13=5,000 cps
ACR in the direction from node device 11 to node device 14=20,000 cps
ACR in the direction from node device 14 to node device 15=15,000 cps
ACR in the direction from node device 15 to node device 13=25,000 cps The route information is transmitted/received between the node devices by the PNNI protocol, and is recognized by all of the node devices 11–15.

FIG. 3A shows route information 70 of the initial status which the route information managing portion 23 of the node device 11 holds for the node device 13.

Namely, there are the following two "routes" which extend to the node device 13 from the node device 11.
Route 51: "route list"=node device 11→12→13
Route 52: "route list"=node device 11→14→15→13

Also, the numbers of node devices which the routes 51 and 52 pass through (="passing number of node devices") are 1 and 2, respectively.

The ACR of the route 51 is 5,000 cps which is smaller between ACR=30,000 cps in the direction of node device 11→12 and ACR=5,000 cps in the direction of node device 12→13. Similarly, the ACR of the route 52 is 15,000 cps.

In the embodiment (1), the case where the terminal 31 communicates with the terminal 32, and the definition of the cell rate (ACR) and the optimum route secured by this communication is as follows will now be described.
"Cell rate"≧10,000 cps
Optimum route: Route with the smallest "passing number of node devices"

Accordingly, the optimum route of the connection between the node device 11 accommodating the terminal 31 and the node device 13 accommodating the terminal 32 is the route 51 with the passing number of node devices is "1". However, this route 51 does not satisfy the "cell rate"≧10,000 cps.

FIG. 4A shows a sequence of a route switchover reservation in the node device 11.

Step S1: When the node device 11 sets the connection with the node device 13, the call processor 21 of the node device 11 inquires of the route selector 22 the route to the node device 13 accommodating the destination terminal 32 by a route inquiring signal 71 including the address of the terminal 32 and the demand cell rate=10000 cps.

Steps S2 and S3: The route selector 22 inquires of the route information managing portion 23 the route reaching the node device 13 which accommodates the terminal 32 by a route information inquiring signal 73, while the route information managing portion 23 returns the route information of the routes 51 and 52 shown in FIG. 3A by a route information response signal 74.

Step S4: Although the optimum route reaching the node device 13 is the route 51 with the passing number of node devices being "1", its "ACR (available cell rate)" is only 5,000 cps. Therefore, the route selector 22 selects the route 52, which is not optimum because of the passing number of node devices being "2" but is available, and responds to the call processor 21 by a route response signal 72.

Figure 2B:
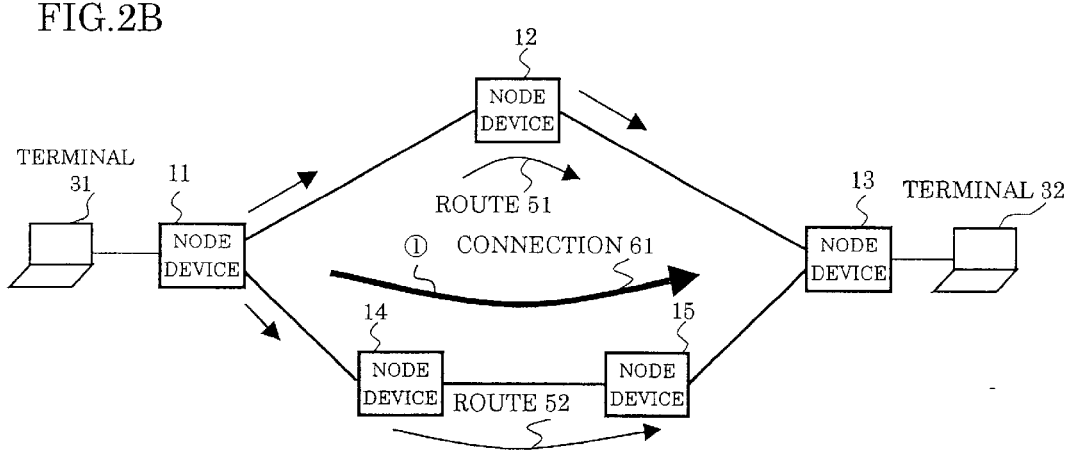

Step S5 (See ① in FIG. 2B): The call processor 21 performs the setting process of the connection passing the route 52, and sets a connection 61 (call identifier=0001) which reaches the node device 13 through the node devices 14 and 15.

Step S6: Furthermore, in order to enable the switchover to the optimum route 51 when it becomes available, the route selector 22 notifies the route switchover reservation portion 25 of the reservation information of the optimum route 51 which is the optimum route and the information of the route 52 which is not optimum but is selected as in the above operation.

Step S7: In order to enable the release of the concerned connection after the optimum route becomes available and the transfer of the data frame is switched over to the optimum route, the call processor 21 provides the route switchover reservation portion 25 with the reservation information registering request signal (connection information) 78 including the connection identifier of the concerned connection 61, the route 52, and the like.

Step S8: The route switchover reservation portion 25 accepts the route switchover reservation request based on the optimum route information 79 and the reservation information registering request signal (connection information) 78 to be stored as the route reservation information.

FIG. 5A shows route reservation information which the route switchover reservation portion 25 of the node device 11 holds.

In this route reservation information, the followings are registered: "Call identifier"="0001" and its "demand cell rate"="10,000 cps" for "connection information", "route"="52 (11→14→15→13)", "passing node device number"="2", and "available cell rate"="10,000 cps" for "set connection route information", and "route"="51 (11→12→13)", "passing node device number"="1", and "reservation cell rate"="10,000 cps" for "optimum route reservation information".

Figure 2C:
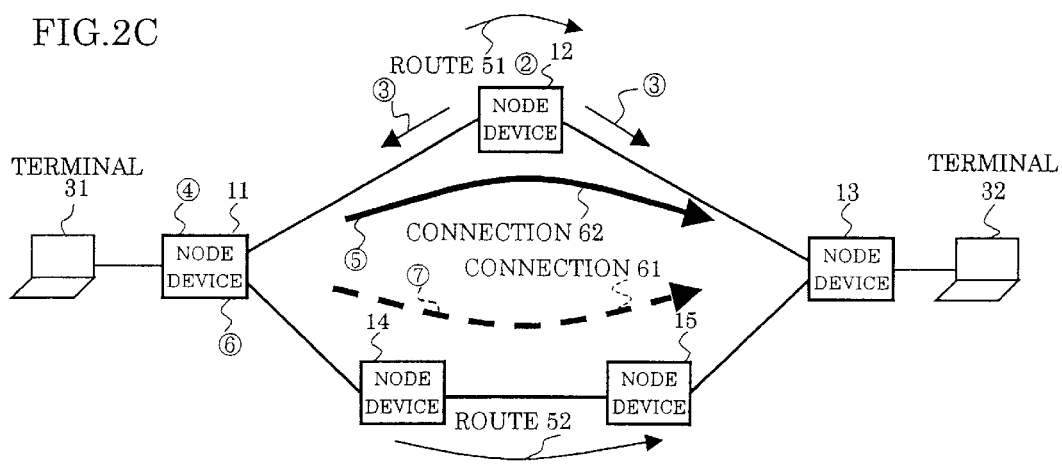

The case where the other connection between the node devices 12 and 13 is released, and the available cell rate changes from 5,000 cps to 20,000 cps will now be described referring to FIGS. 4B and 2C.
Step S10 (See ② in FIG. 2C)
The topology change occurs.
Step S11 (See ③ in FIG. 2C)
The node device 12 advertises the concerned topology change information ③ to the other node devices 11 and 13 from the route information transmitting/receiving portion 24 by using the PNNI protocol.

Step S12: The route information managing portion 23 of the node device 11 updates the route information 70 based on the topology change information ③ received through the route information transmitting/receiving portion 24.

FIG. 3B shows route information 70 after the topology change, in which the "ACR" of the route 51 in FIG. 3A changes from 500 cps to 20,000 cps (see hatched portion).

Step S13: The route information managing portion 23 notifies the route switchover reservation portion 25 of the change of the route information 70 by the route information change notifying signal 80.

Steps S14 and S15 (See ④ in FIG. 2C): The route switchover reservation portion 25 detects that the reserved route 51 becomes available due to the change of the above-mentioned route information 70, and demands by the route switchover demand signal 83 that the existing connection passing the route 52 be switched over to the route 51 of the route switchover portion 26.

Step S16: The route switchover portion 26 demands the setting of the connection passing the optimum route 51 of the call processor 21 by the switchover destination route notifying signal 85.

Step S17 (See ⑤ in FIG. 2C): The call processor 21 demands the setting of the connection passing the route 51 to establish a new connection (call identifier=0002) with the node devices 13 through the node device 12.

Step S18: The call processor 21 switches over the transfer of the data frame, from the route 52 to the route 51, transmitted from the terminal 31 based on the switchover destination route notifying signal 85 from the route switchover portion 26.

In order to enable the rearrangement of the data frame received in the receiving node device 13 through the different connections (connections before and after switchover), the following method, for example, can be mentioned.

When the transferring data are, for example, IP data in the node device 11, and the IP frame is divided into ATM cells to be transmitted, the concerned ATM cells and the followings are to be transferred to the switchover destination with making it a trigger that the ATM cell corresponding to the head of the IP frame is detected. Thus, the reproduction of the data at the node device 13 can be completely executed.

Step S19 (See ⑥ in FIG. 2C): The route switchover portion 26 demands the existing route connection to be released by the above-mentioned switchover timing.

Step S20 (See ⑦ in FIG. 2C): After the data frame does not flow through the existing connection 61 set by the route 52, the call processor 21 releases the existing connection 61.

Step S21: After setting the connection at the optimum route 51, the call processor 21 demands updating the route reservation information of the route switchover reservation portion 25.

Step S22: The route switchover reservation portion 25 updates the route reservation information.

FIG. 5B shows route reservation information after the update, in which "connection information" is updated to the connection information of "call identifier"="0002", "set connection route information" is updated to the route information of the connection 62 of "route"="51 (11→12→13)", and "optimum route reservation information" is updated to "route"=" . . . ; no reservation" (see hatched portion).

As mentioned above, if the network is arranged by the node device according to the present invention, and when the optimum route can not be used upon starting the communication, the reservation of the optimum route enables the optimum route switched over from the existing route when the optimum route becomes available with the changes of the resource and the topology status within the network.

Also, it is possible to maintain the data frame transferring between the terminals 31 and 32 without a new special function on the terminal side. Furthermore, even if node devices other than the node device 11 are the prior art ATM switch node devices without the function of the present invention, the present invention can function.

While the above embodiment (1) has described the example that the route information managing portion 23 notifies the route switchover reservation portion 25 of the topology change (route information) whereby the route switchover reservation portion 25 detects the change of the route information, the topology change may be detected by the route switchover reservation portion 25 periodically monitoring the route information which the route information managing portion 23 holds.

Also in this embodiment (1), the demanded QoS which forms a condition of the route selection: ACR="10,000 cps" has been described as the condition which must be satisfied. However, it is possible to set a connection with a present available cell rate ACR="5,000 cps" when there is no route to satisfy e.g. ACR="10,000 cps", and to switch over the route to another route which satisfies the condition when the route with more than ACR="10,000 cps" occurs.

Embodiment (2)

FIG. 6A shows an embodiment (2) of a node device of the present invention which forms a network. This network is composed of the node device 11, the node devices 12, 14, and 15 connected to the node device 11, and the node device 13 connected to the node devices 12, 14, and 15. The node devices 11 and 13 respectively accommodate the terminals 31 and 32.

In this network, from the node device 11 to the node device 13, there are routes 51, 52, and 53 respectively passing the node devices 12, 14 and 15.

In FIG. 6A, in the same way as FIG. 2A, the available cell rate (ACR), the cell transfer delay (CTD), and the cell delay variation (CDV) in the node devices relating to the routes 51–53 in the direction from node device 11 to node device 13 are shown.

FIGS. 7A and 7B show route information 70 which the route information managing portion 23 of the node device 11 holds. In FIG. 7A, "route list", "ACR", "CTD (delay)", and "CDV (cell delay variation)" of the present (initial status) "routes" "51–53" are shown. As described in FIG. 2A, the "ACR" of each route is the minimum value of the available cell rates between the node devices on the route. In addition, "CTD" and "CDV" of each route are respectively the total value of the "CTD's" and "CDV's" between the node devices on the route.

In this embodiment (2), the case where the terminal 31 communicates with the terminal 32, and the cell rate (ACR) and the optimum route which this communication demands are defined as follows will now be described.

"Cell rate"="10,000 cps"

Optimum route: "delay"≦"30 µs"

Accordingly, the optimum route of the connection between the node device 11 accommodating the terminal 31 and the node device 13 accommodating the terminal 32 is the route 51 with "delay"="20 µs".

The node device 11 which has received the connection setting demand from the terminal 31 tries to set the connection with the node device 13 accommodating the receiving terminal 32. Although only the route 51 (delay 20 µs) satisfies "delay"≦"30 µs" among those three routes 51–53 shown in FIG. 7A, it can not be selected because its available cell rate is only 5,000 cps.

An operation procedure of a connection setting will now be described referring to FIG. 6B.

Procedure ①: The node device 11 selects the route 52 which is not optimum because of the delay being 40 µs but is available, and sets the connection 61 of the identifier="0001".

FIG. 7B shows route information 70 after setting the connection 61. By setting the connection 61, the available cell rate of the route 52 becomes 30,000 cps−10,000 cps=20,000 cps (see hatched portion).

It is assumed that there is no change of the delay and the cell delay variation in the routes according to the setting of the connection 61.

In order to enable the switchover when the optimum route 51 with the delay=20 µs becomes available, the route switchover reservation portion 25 of the node device 11 stores the information of the optimum route 51 and the connection 61 as the route reservation information.

FIG. 8A shows the route reservation information at this time, in which the followings are reserved: "Identifier" of the connection="0001", "demand cell rate"="10,000", "demand delay"="30", and "demand cell delay variation"= "–: no demand" for "demanded QoS information"; "route"= "52", "available cell rate"="10,000", "delay"="40", and "cell delay variation"="5" for "set connection route information"; and "route"="51", "reservation cell rate"="10, 000", "delay"="20", and "cell delay variation"="6" for "optimum route reservation information".

It is to be noted that the function and the operation of each portion in the node device 11 are the same as those in the embodiment (1).

Hereinafter, the case where a setting demand occurs for a new connection which demands the following QoS's from the node device 11 to the node device 13 will be described: "Cell rate"="10,000 cps" and "cell delay variation"≦"4 µs"

First of all, although only the route 53 ("cell delay variation"=3 µs) satisfies "cell delay variation"≦"4 µs" in the routes 51–53 of FIG. 7B, it can not be selected because its available cell rate is only 5,000 cps. It is to be noted that the data can be transmitted in the cell rate less than "10,000 cps", while the cell transfer delay and the cell delay variation also change in that case. Therefore, it is assumed that the cell rate can not be changed.

Procedure ②(See FIG. 6B): The available route 52, which is not optimum because of the "cell delay variation" being 5 µs, is selected, so that the connection 62 of "call identifier"="0002" is set.

At this time, in order to enable the route switchover when the optimum route 53 becomes available, the route switchover reservation portion 25 of the node device 11 reserves the information of the optimum route 53 and the connection 62.

FIG. 8B shows route reservation information which the route switchover reservation portion 25 holds. It is the route reservation information of FIG. 8A to which the information of the connection 62 of "call identifier"="0002" is further added.

The case where the existing connection (not shown) which has been using the route 51 is released, and its available cell rate changes from 5,000 cps to 20,000 cps will now be described referring to FIG. 6C.

The route switchover reservation portion 25 of the node device 11 receives the concerned topology change information from the route information managing portion 23, and recognizes that the route 51 (node device 11→12→13) has been reserved for the connection 61 of "call identifier"= "0001" by referring to the optimum route reservation information included in the route reservation information shown in FIG. 8B.

Then, the following procedures are executed:

Procedure ③: The node device 11 establishes a new connection 63 ("call identifier"="0003") with respect to the node device 13 through the node device 12 on the route 51 in the same procedure as that of the embodiment (1).

Procedure ④: The node device 11 switches over the transfer connection of the data frame to the connection 63.

Procedure ⑤: Existing connection 61 is released.

The case where the existing connection has been using the route 53 is released, and the available cell rate of the route 53 changes from 5,000 cps to 20,000 cps will now be described referring to the same FIG. 6C.

The route switchover reservation portion 25 of the node device 11 receives the concerned topology change information from the route information managing portion 23, and recognizes that the route 53 (node device 11→15→13) has been reserved for the connection 62 of "call identifier"= "0002" based on the route reservation information of FIG. 8B. The call processor 21 executes the following procedures:

Procedure ⑥: The node device 11 sets a new connection 64 ("call identifier"="0004") with respect to the node device 13 through the node device 15 on the route 53.

Procedure ⑦: The transfer connection of the data frame is switched over to the new connection 64.

Procedure ⑧: The existing connection 62 is released.

As mentioned above, according to the node device of the present invention, even when the optimum route which satisfies the demanded QoS is unavailable and when the optimum route becomes available for every QoS demanded upon the setting of the connections, it becomes possible to make a switchover to the optimum route.

Also, when a plurality of QoS's are designated, it is required to consider the priorities of the QoS's. In the above, the examples in which the demanded QoS's are a cell rate and a delay, or a cell rate and a cell delay variation are shown. However, when the cell rate, the delay, and the cell delay variation are designated at the connection setting demand, it is possible to determine the QoS preferentially made the determination reference of the route selection e.g. in the service category.

Generally, CBR (Constant Bit Rate) is considered to be sensitive to the delay, and VBR is to the cell delay variation. Therefore, if the service category is the CBR, the route with the smaller delay is considered to be the optimum route, and if the service category is the VBR, the route with the smaller cell delay variation is considered to be the optimum route. Thus, it becomes possible to set priorities to a plurality of demanded QoS's.

Embodiment (3)

FIGS. 9A-9C show an embodiment (3) of a node device of the present invention which forms a network. This network formation is the same as that of the embodiment (2).

FIG. 10 shows route information 70, which the route information managing portion 23 of the node device 11 holds, of the routes 51–53 in the direction of node device 11→13. The "ACR's" of the routes 51, 52, and 53 are assumed to be "20,000 cps", "5,000 cps", and "10,000 cps" respectively, the "CTD's" be "50 µs", "20 µs", and "40 µs" respectively, and the "CDV's" be "6 µs", "5 µs", and "3 µs" respectively.

In this embodiment (3), the case where the terminal 31 communicates with the terminal 32, and the QoS which this communication demands as the optimum route is as follows will now be described referring to FIGS. 9A-9C.

Optimum route: "cell rate"="15,000 cps" and "delay"≦"30 µs"

In FIGS. 9A-9C, the node device 11 which has received the connection setting demand from the terminal 31 tries to set the connection with the node device 13 accommodating the terminal 32 on the receiving side. Although only the route 52 ("delay"="20 µs") satisfies delay≦30 µs among the routes 51–53 (see FIG. 10), it can not be selected because its available cell rate is only 5,000 cps.

Furthermore, the route 53 with the second smallest delay ("delay"="40 µs") can not be selected either because its available cell rate is only 10,000 cps.

Therefore, the node device 11 selects the route 51, which is not optimum because of the delay being 50 µs but is available to set the connection 61 of "call identifier"= "0001", as shown by the procedure ① in FIG. 9A.

FIG. 11A shows route reservation information which the route switchover reservation portion 25 of the node device 11 holds. In order to enable the route switchover when the route 53 which is more advantageous than the selected route 51 and the optimum route 52 become available, "reservation cell rate", "delay", and "cell delay variation" of the routes 52 and 53 are respectively stored as "optimum route reservation information" in the route reservation information.

The procedure after the available cell rate of the route 53 in the node device 15→node device 13 has changed from 10,000 cps to 20,000 cps will now be described as shown by Procedure ② in FIG. 9B.

Procedure ③ (See FIG. 9B)

The route switchover reservation portion 25 of the node device 11 receives the concerned topology change information through the route information managing portion 23.

Procedure ④

Based on the route reservation information of FIG. 11A, it is detected that the route 53 (node device 11→15→13), which is not optimum but reserved as more advantageous route than the present route, is available as for the connection of "call identifier"="0001".

Procedure ⑤

The node device 11 sets a new connection 62 of "call identifier"="0002" with the node device 13 on the route 53 through the node device 15.

Procedure ⑥

The node device 11 switches over the transfer connection of the data frame from the existing connection 61 on the route 51 to the new connection 62 on the route 53.

Procedure ⑦

The existing connection 61 on the route 51 is released.

At this time, the route switchover reservation portion 25 updates the route reservation information. FIG. 11B shows route reservation information after the update, in which "call identifier"="0002" of the connection is set as "demanded QoS information", the route 53 is set as "set connection route information", and the route 52 is set as "optimum route reservation information".

From this route reservation information, it is recognized that "delay"="40 $\mu$s" of "set connection route information" is still large compared with the "demand delay"="30 $\mu$s" (see hatched portion). In order to make it smaller, the switchover to the route 52 shown in "optimum route reservation information" has only to be performed.

The case where the available cell rate on the route 52 from the node device 14 to node device 13 changes from 5,000 cps to 20,000 cps will now be described as shown by Procedure ① in FIG. 9C.

Procedures ② and ③

The route switchover reservation portion 25 of the node device 11 receives the concerned topology change information through the route information managing portion 23 to detect the topology change. By the route reservation information of FIG. 11B, it is recognized that the route 52 (node device 11→14→13) has been reserved as the optimum route for the connection 62 of the connection "call identifier"= "0002".

Procedure ④

The node device 11 sets a new connection 63 of "call identifier"="0003" with respect to the node device 13 on the route 52 through the node device 14.

Procedure ⑤

The transfer connection of the data frame is switched over from the existing connection on the route 53 to the new connection on the route 52.

Procedure ⑥

The existing connection on the route 53 is released.

As a result, the communication on the route 52 which satisfies the demanded QoS of "delay"≦30 $\mu$s becomes possible.

As mentioned above, according to the node device of the present invention, even when the optimum route which satisfies the demanded QoS is unavailable and when the route which is more advantageous than the present route becomes available, the switchover to the advantageous route can be performed.

Also, by repeating the switchover to more advantageous route, it can be expected that the demanded QoS is finally satisfied. In the description of the above embodiment (3), the demanded QoS is limited to the delay. However, the case where the other QoS's are demanded can be similarly applied.

Embodiment (4)

FIG. 12A shows a network formation in an embodiment (4) of a node device of the present invention. This network formation is the same as those in the embodiments (2) and (3).

In this embodiment (4), the case where the terminal 31 starts the communication with the terminal 32 by the following demanded QoS will be described:

"Cell rate"="10,000 cps" and "delay"≦"30 $\mu$s"

The node device 11 which has received the connection setting demand sets the connection with the node device 13 accommodating the terminal 32 on the receiving side.

FIG. 13A shows route information 70, which the route information managing portion 23 of the node device 11 holds, from the node device 11 to the node device 13. In the routes 51–53 included in the route information 70, only the route 51 with "delay"="20 $\mu$s" satisfies "delay"≦30 $\mu$s. However, it can not be selected because its available cell rate is only 5,000 cps. Presently, the delays of the routes 52 and 53 are 40 $\mu$s, and their available cell rates are more than 10,000 cps.

In a Procedure ① (see FIG. 12A), it is assumed that the node device 11 selects the route 52 which is not optimum but available, and establishes the connection 61 of "call identifier"="0001" with the node device 13 through the node device 14.

By setting the connection 61 on the route 52, the available cell rate of the route 52 becomes 15,000 cps–10,000 cps= 5,000 cps. FIG. 13B shows route information after setting the connection 61 from the node device 11 to the node device 13. It is to be noted that there is no change of "delay" and "cell delay variation" on the routes according to the setting of the connection 61 in the same way as the embodiment (1).

At this time, in order to enable the route switchover when the optimum route 51 becomes available, the route switchover reservation portion 25 of the node device 11 stores the information of the route 51 and the call identifier of the connection 61 as the route reservation information.

FIG. 14A shows route reservation information, in which "call identifier"="0001" is set in "demanded QoS information", the route 52 is set in "set connection route information", and the route 51 is set in "optimum route reservation information".

The case where the demanded QoS is as follows and a setting demand of a new connection 62 from the terminal 31 to the terminal 32 occurs will now be described:

"Cell rate"="10,000 cps" and "cell delay variation"≦"4 $\mu$s"

Although only the route 52 satisfies "cell delay variation"≦"4 $\mu$s" among the routes 51–53 in FIG. 13B, it can not be selected because its available cell rate is only 5,000 cps.

In Procedure ②  of FIG. 12B, the node device 11 selects the route 53 with "cell delay variation"="5 µs" which is not optimum but available, and sets the connection 62 of "call identifier"="0002" with the node device 13 through the node device 15.

It is to be noted that there is no change of the cell delay variation on the routes according to the setting of the connection 62.

FIG. 13C shows route information of the node device 11 after setting the connection 62 from the node device 11 to the node device 13, in which the "ACR" of the route 53 is updated to 30,000−10,000=20,000 (see hatched portion).

At this time, in order to enable the route switchover when the optimum route 52 becomes available, the route switchover reservation portion 25 of the node device 11 stores the information of the route 52 and the call identifier of the connection 62 in the route reservation information. FIG. 14B shows this route reservation information, to which "demanded QoS information", "set connection route information", and "optimum route reservation information" corresponding to the connection of "call identifier"="0002" are added.

FIGS. 15A and 15B show the case where a maintenance terminal 30 is connected to the node device 11 shown in FIG. 12A. A maintenance person can obtain the route information and the route reservation information through the maintenance terminal 30 and can make switchover instructions.

Figure 16A:
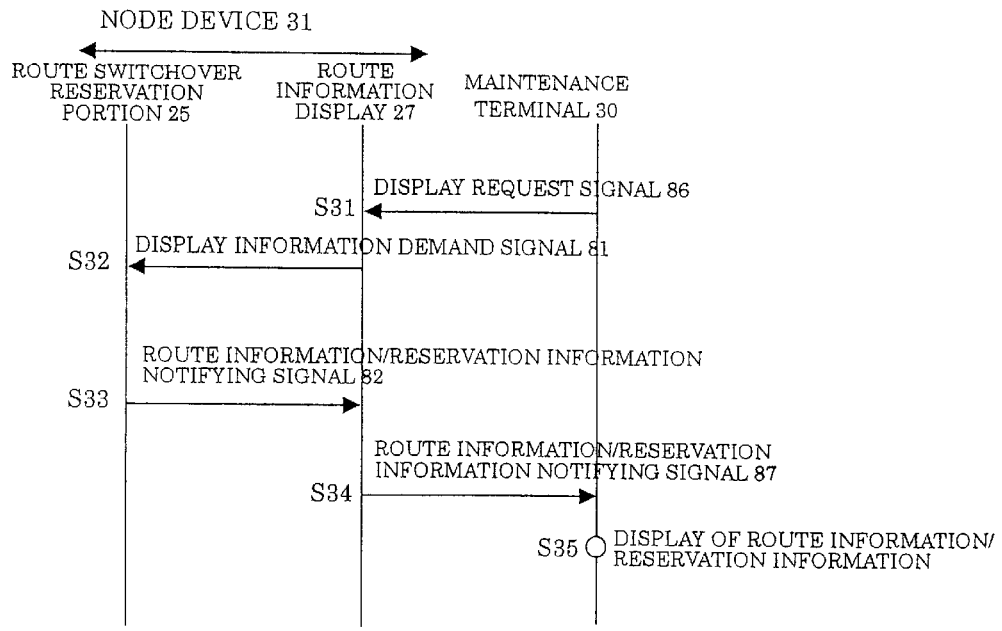
FIGS. 16A and 16B are sequence diagrams showing a display operation example of route information and the like and a route switchover operation example in the operation embodiment (4) of a node device according to the present invention.

FIG. 16A shows a following sequence example when the maintenance person obtains the route information and the route reservation information from the node device 11.

Step S31

When the maintenance person desires to know the present route working status (route information) and the route reservation information, he/she demands a display of the above information of a route information display 27 of the node device 11 through the maintenance terminal 30 with a display request signal 86.

Step S32

The route information display 27 notifies the route switchover reservation portion 25 of the display request signal 86 as a display information demand signal 81.

Step S33

The route switchover reservation portion 25 returns a route information/reservation information notifying signal 82 including the route information of FIG. 13C and the route reservation information of FIG. 14B to the route information display 27.

Step S34

The route information display 27 provides the maintenance terminal 30 with the route information/reservation information notifying signal 82 as a notifying signal 87.

Step S35

The maintenance terminal 30 displays the route information and the route reservation information included in the notifying signal 87.

FIGS. 17A and 17B show a display example of the maintenance terminal 30. FIG. 17A shows the whole maintenance terminal 30, while FIG. 17B shows the details of the screen, on which the route information of FIG. 13C and the route reservation information of FIG. 14B are displayed.

Thus, it becomes possible to provide the maintenance person with the route information and the route reservation information.

When the maintenance person desires to satisfy the demanded QoS of the connection 62 of "call identifier"= "0002" from the screen (see FIG. 17B) of the maintenance terminal 30, he/she recognizes that the available cell rate of the route 52 (node device 11→14→13) increases to 15,000 cps and the demanded QoS of the connection 62 is satisfied if the connection 61 of "call identifier"="0001" is shifted to the route 53 (node device 11→15→13).

Figure 16B:
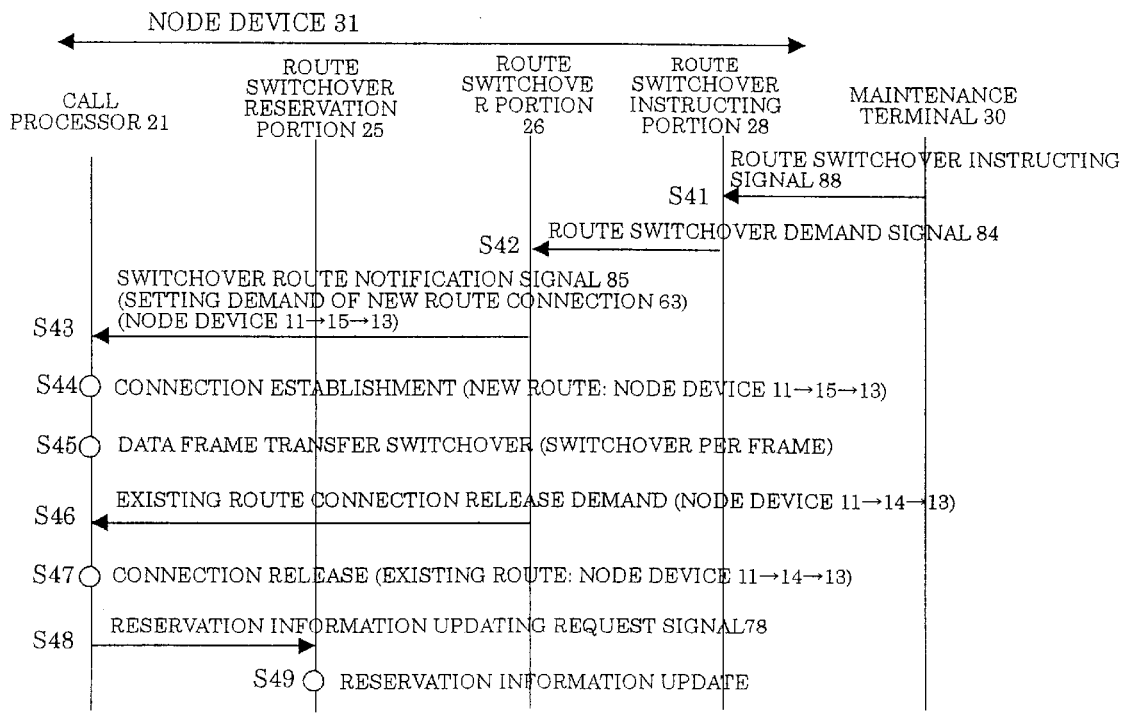

FIG. 16B shows an operation sequence in which the maintenance person makes the route switchover instructions toward the node device 11 from the maintenance terminal 30.

Step S41 (See Procedure ③ in FIG. 15A)

The maintenance person demands the switchover of the connection 61 from the route 52 to the route 53 of the route switchover instructing portion 28 by the route switchover instructing signal 88.

Step S42

The route switchover instructing portion 28 notifies the route switchover portion 26 of the route switchover instructing signal 88 as the route switchover demand signal 84.

Step S43

The route switchover portion 26 demands the setting of a new route connection on the route 53 of the call processor 21 by the switchover route notifying signal 85.

Step S44 (Procedure ④)

The call processor 21 establishes a new connection 63 of "call identifier"="0003" with the node device 13 on the route 53 through the node device 15.

Step S45 (Procedure ⑤)

The call processor 21 switches over the transfer connection of the data frame from the connection 61 on the route 52 to the connection 63 on the route 53.

Steps S46 and S47 (Procedure ⑥)

Based on the release demand from the route switchover portion 26, the existing connection 61 is released.

Step S48

The call processor 21 notifies the route switchover reservation portion 25 of the change of the satisfaction status of the demanded QoS concerning the connections 61 and 63 and the connection information such as connection setting route by the reservation information updating request signal 78.

Step S49

The route switchover reservation portion 25 updates the route reservation information.

FIG. 14C shows route reservation information after the update, in which the connection 61 of "call identifier"= "0001" of the route reservation information in FIG. 14B is deleted and the connection 63 of "call identifier"="0003" is added.

By releasing the existing connection 61 on the route 52, as shown in procedure (①) of FIG. 15B, the available cell rate on the route 52 in the node device 14→13 increases from 5,000 cps to 15,000 cps.

FIG. 13D shows the route information of the node device 11→node device 13 which the route information managing portion 23 of the node device 11 holds.

By this route information, the following procedures are executed in FIG. 15B.

Procedures ② and ③

The route switchover reservation portion 25 of the node device 11 receives the concerned topology change information from the route information managing portion 23 to detect the change of the route information. The route switchover reservation portion 25 recognizes that the route information changes as e.g. the above-mentioned topology status changes, and the reserved route 52 which satisfies the demanded QoS of the connection 62 becomes available. The route switchover reservation portion 25 demands the switchover from the route 53 to the route 52 of the connection 62 of the route switchover portion 26.

Procedure ④

The route switchover portion 26 demands the setting of a new connection 64 on the route 52 of the call processor 21. The call processor 21 sets the new connection 64 of "call identifier"="0004" with the node device 13 through the node device 14 on the route 52.

Procedure ⑤

The node device 11 then switches over the transfer connection of the data frame to the connection 64 on the route 53 to release the existing connection 62. Furthermore, the call processor 21 notifies the route switchover reservation portion 25 that the connection which satisfies the demanded QoS of the connection 62 has been set.

The route switchover reservation portion 25 deletes the route reservation information concerning the connection 62 ("call identifier"="0002") to change the route reservation information as shown in FIG. 14D.

The switchover processing of the above connection 62→64 is automatically performed by the function of the node device of the present invention when the topology change is detected and the optimum route becomes available in the same way as the embodiment (1).

As mentioned above, according to the present invention, the route working status over the present network and the route reservation information for the route switchover can be displayed on the maintenance terminal 30. Furthermore, based on the display information, the maintenance person can arbitrarily switch over the route which is made conscious of the demanded QoS.

Also, in the above-mentioned embodiment (4), the example in which the latest route information and the route reservation information according to the arbitrary demand from the maintenance terminal 30 are displayed on the maintenance terminal 30 has been described, while the active display on the maintenance terminal 30 can be executed with the change of the route information or the route reservation information being made a trigger.

It is to be noted that for the function of the node device according to the present invention, a part of the node devices (node device 11 in embodiments (1)–(4)) accommodating the terminal on the transmitting side has only to have the function of the present invention, so that the terminals and the other node devices may have a function of a prior art level.

Also in the above embodiments (1)–(4), the PNNI has been described as an application example. However, in the network having the same routing function not limiting to the PNNI, the node device according to the present invention can function efficiently.

Furthermore, as to the holding of the route reservation information after the route switchover, even if the method of updating the route reservation information after the switchover to the optimum route is used, or the method of deleting the route reservation information after the switchover to the optimum route is used, the present invention is similarly and essentially effected.

As described above, a node device according to the present invention is arranged such that a route selector selects a connection setting route based on dynamic route information of a network upon starting a communication, and generates a reservation request of a predetermined optimum route to a route switchover reservation portion unless the connection setting route is the predetermined optimum route, the route switchover reservation portion monitors whether or not the predetermined optimum route becomes available based on the route information during the communication, and makes switchover instructions toward the predetermined optimum route to a call processor. Therefore, it becomes possible to set the first connection in the route which is not optimum but available upon starting the communication, and to set the second connection in the optimum route to be dynamically switched over when an advantageous route becomes available by a topology change or the like during the communication.

Also, the node device according to the present invention is arranged such that the route selector selects and generates a reservation request of a plurality of optimum routes with priorities set. Therefore, it becomes possible to switch over the connection to the optimum route which has become available and more advantageous than the present route among a plurality of reserved optimum routes. By repeating the switchover, it is expected that the connection is finally switched over to the optimum route with the highest priority, and the whole network settles in the optimum resource working status.

Also, the node device according to the present invention is arranged such that the route selector selects the optimum route based on service quality (QoS) which a user has designated. Therefore, it becomes possible to dynamically switch over the route based on the QoS, which the user has designated, e.g. an available cell rate, a cell transfer delay, and a cell delay variation.

Also, the node device according to the present invention is arranged such that a route information display displays the route information, the route reservation information, or available status information of the routes, and the route switchover instructing portion instructs the call processor to switch over the connection to an arbitrary route. Therefore, a maintenance person (user), for example, can grasp the present route information, the optimum route information, or available status on the routes, and switch over the existing connection to the connection of the arbitrary route.

Furthermore, when the connection setting is excused considering QoS (Quality of Service) in the interworking between the IP network and the ATM (Asynchronous Transfer Mode) network, the node device of the present invention is effective.

What we claim is:

1. A node device comprising:

a route information managing portion for managing dynamic route information of a network, a route selector for selecting a connection setting route based on the route information upon starting a communication, and for generating a reservation request of a predetermined optimum route unless the connection setting route is the predetermined optimum route;

a route switchover reservation portion for managing the predetermined optimum route as route reservation information in response to the reservation request, for monitoring whether or not the predetermined optimum route becomes available based on the route information during the communication, and for making switchover instructions toward the predetermined optimum route when the predetermined optimum route becomes available;

a call processor for setting a first connection in the selected connection setting route and for setting a second connection in the predetermined optimum route by the switchover instructions; and a route switchover instructing portion for providing the call processor with instructions for switching over a predetermined connection to a predetermined route.

2. A node device comprising:
a route information managing portion for managing dynamic route information of a network;
a route selector for selecting a connection setting route based on the route information upon starting a communication, and for generating a reservation request of a predetermined optimum route unless the connection setting route is the predetermined optimum route;
a route switchover reservation portion for managing the predetermined optimum route as route reservation information in response to the reservation request, for monitoring whether or not the predetermined optimum route becomes available based on the route information during the communication, and for making switchover instructions toward the predetermined optimum route when the predetermined optimum route becomes available;
a call processor for setting a first connection in the selected connection setting route and for setting a second connection in the predetermined optimum route by the switchover instructions; and
a route switchover instructing portion for providing the call processor with instructions for switching over a predetermined connection to a predetermined route,
wherein after setting the second connection the call processor confirms that a data transmission/reception at the first connection has been completed to release the first connection.

3. A node device comprising:
a route information managing portion for managing dynamic route information of a network,
a route selector for selecting a connection setting route based on the route information upon starting a communication, and for generating a reservation request of a predetermined optimum route unless the connection setting route is the predetermined optimum route;
a route switchover reservation portion for managing the predetermined optimum route as route reservation information in response to the reservation request, for monitoring whether or not the predetermined optimum route becomes available based on the route information during the communication, and for making switchover instructions toward the predetermined optimum route when the predetermined optimum route becomes available;
a call processor for setting a first connection in the selected connection setting route and for setting a second connection in the predetermined optimum route by the switchover instructions; and
a route switchover instructing portion for providing the call processor with instructions for switching over a predetermined connection to a predetermined route,
wherein the route selector generates a reservation request of a plurality of optimum routes with priorities set, and the route switchover reservation portion makes the switchover instructions toward the predetermined optimum route based on the priorities.

4. A node device comprising:
a route information managing portion for managing dynamic route information of a network,
a route selector for selecting a connection setting route based on the route information upon starting a communication, and for generating a reservation request of a predetermined optimum route unless the connection setting route is the predetermined optimum route;
a route switchover reservation portion for managing the predetermined optimum route as route reservation information in response to the reservation request, for monitoring whether or not the predetermined optimum route becomes available based on the route information during the communication, and for making switchover instructions toward the predetermined optimum route when the predetermined optimum route becomes available;
a call processor for setting a first connection in the selected connection setting route and for setting a second connection in the predetermined optimum route by the switchover instructions; and
a route switchover instructing portion for providing the call processor with instructions for switching over a predetermined connection to a predetermined route,
wherein the route selector generates the reservation request of the predetermined optimum route based on a predetermined quality of service.

5. A node device comprising:
a route information managing portion for managing dynamic route information of a network,
a route selector for selecting a connection setting route based on the route information upon starting a communication, and for generating a reservation request of a predetermined optimum route unless the connection setting route is the predetermined optimum route;
a route switchover reservation portion for managing the predetermined optimum route as route reservation information in response to the reservation request, for monitoring whether or not the predetermined optimum route becomes available based on the route information during the communication, and for making switchover instructions toward the predetermined optimum route when the predetermined optimum route becomes available;
a call processor for setting a first connection in the selected connection setting route and for setting a second connection in the predetermined optimum route by the switchover instructions;
a route information display for displaying at least one of the route information, the route reservation information, and available status information of the routes; and
a route switchover instructing portion for providing the call processor with instructions for switching over a predetermined connection to a predetermined route.

* * * * *